(12) United States Patent
Chin et al.

(10) Patent No.: US 12,301,100 B2
(45) Date of Patent: May 13, 2025

(54) POWER FACTOR CORRECTION CIRCUIT AND POWER CONVERTER

(71) Applicant: Huawei Digital Power Technologies Co., Ltd., Guangdong (CN)

(72) Inventors: Ken Chin, Shenzhen (CN); Yuanjun Liu, Shenzhen (CN); Zhixiang Hu, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 197 days.

(21) Appl. No.: 18/168,515

(22) Filed: Feb. 13, 2023

(65) Prior Publication Data
US 2023/0198381 A1   Jun. 22, 2023

Related U.S. Application Data

(63) Continuation of application No. PCT/CN2020/112324, filed on Aug. 29, 2020.

(51) Int. Cl.
| | | |
|---|---|---|
| H02M 1/42 | (2007.01) | |
| H02M 1/32 | (2007.01) | |
| H02M 1/44 | (2007.01) | |
| H02M 3/04 | (2006.01) | |
| H02M 7/217 | (2006.01) | |

(52) U.S. Cl.
CPC .......... *H02M 1/4208* (2013.01); *H02M 1/32* (2013.01); *H02M 1/44* (2013.01); *H02M 3/04* (2013.01); *H02M 7/217* (2013.01)

(58) Field of Classification Search
CPC ........ H02M 1/4208; H02M 1/32; H02M 1/44; H02M 3/04; H02M 7/217
See application file for complete search history.

(56) References Cited

U.S. PATENT DOCUMENTS

| | | | | |
|---|---|---|---|---|
| 5,315,533 A | * | 5/1994 | Stich | H02J 9/062 |
| | | | | 700/298 |
| 2009/0316454 A1 | | 12/2009 | Colbeck et al. | |
| 2015/0318685 A1 | | 11/2015 | Hsieh et al. | |
| 2018/0232026 A1 | | 8/2018 | Zeng | |
| 2022/0094262 A1 | * | 3/2022 | Jaksa | H02M 1/4233 |

FOREIGN PATENT DOCUMENTS

| | | |
|---|---|---|
| CN | 102412720 A | 4/2012 |
| CN | 102412721 A | 4/2012 |
| CN | 205725447 U | 11/2016 |
| CN | 108809075 A | 11/2018 |
| CN | 108923381 A | 11/2018 |
| CN | 109617387 A | 4/2019 |
| CN | 111262425 A | 6/2020 |
| CN | 210789615 U | 6/2020 |

* cited by examiner

*Primary Examiner* — Rafael O De Leon Domenech

(57) ABSTRACT

A power factor correction (PFC) circuit includes an alternating current input circuit, a totem-pole PFC circuit, an input sampling circuit, an output sampling circuit, and a PFC control protection circuit. A first output terminal of the alternating current input circuit is respectively connected to a first input terminal of the totem-pole PFC circuit and a first input terminal of the input sampling circuit.

20 Claims, 15 Drawing Sheets

EMI: Electromagnetic interference   PFC: Power factor correction
DC/DC: Direct current to direct current EMI: Electromagnetic interference   PFC: Power factor correction
DC/DC: Direct current to direct current
PWM: Pulse width modulation   OVP: Overvoltage protection

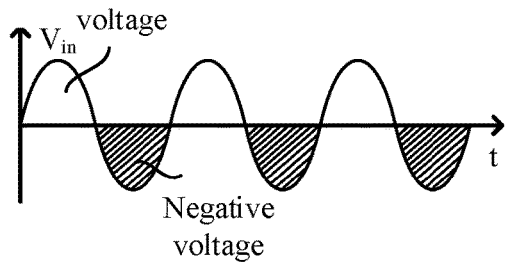

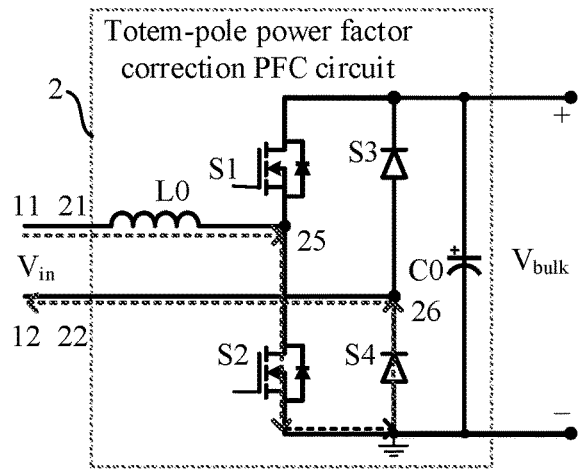

(a) When an alternating current input circuit outputs a positive voltage, an inductor is charged

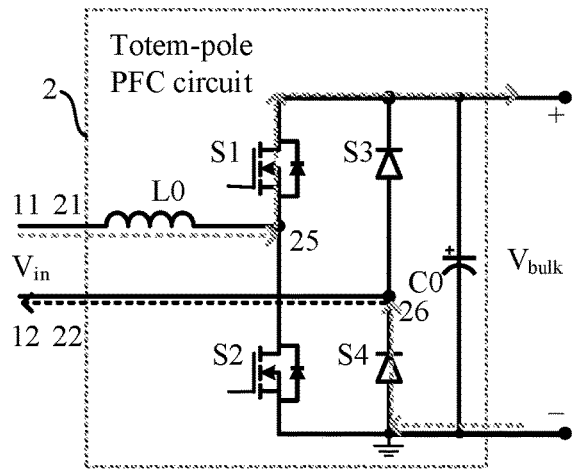

(b) When the alternating current input circuit outputs a positive voltage, the inductor is discharged

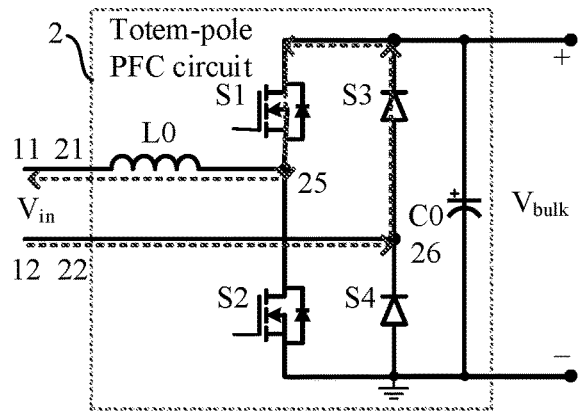

(c) When the alternating current input circuit outputs a negative voltage, the inductor is charged

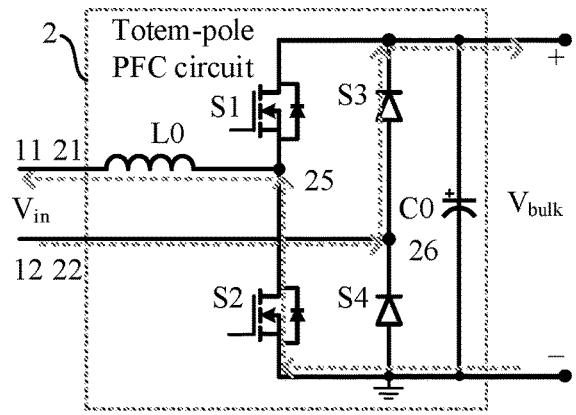

(d) When the alternating current input circuit outputs a negative voltage, the inductor is discharged

FIG. 7

POWER FACTOR CORRECTION CIRCUIT AND POWER CONVERTER

CROSS-REFERENCE TO RELATED APPLICATIONS

This application is a continuation of International Application No. PCT/CN2020/112324, filed on Aug. 29, 2020, the disclosure of which is hereby incorporated by reference in its entirety.

TECHNICAL FIELD

This application relates to the field of electronic circuits, and in particular, to a power factor correction circuit and a power converter.

BACKGROUND

In an alternating current to direct current (alternating current to direct current, AC/DC) power supply field, an operating principle of a power converter is shown in FIG. 1. After an alternating current power supply $V_{ac}$ successively passes through an electromagnetic interference (electromagnetic interference, EMI) filtering module and a totem-pole power factor correction (power factor correction, PFC) circuit, a high-voltage direct current bus voltage $V_{bulk}$ may be output, and after the high-voltage direct current bus voltage $V_{bulk}$ passes through an isolated direct current to direct current (direct current to direct current, DC/DC) circuit, a low-voltage direct current voltage Vout may be output. An oversize $V_{bulk}$ may damage the power supply. Therefore, an overvoltage protection (overvoltage protection, OVP) circuit usually needs to be added to the totem-pole PFC circuit. As shown in FIG. 2, an output sampling circuit composed of voltage divider resistors $R_1$, $R_2$, $R_3$ and $R_{1b}$ is connected to an output terminal of the totem-pole PFC circuit, and $V_{bulk}$ is sampled by using the voltage divider resistor $R_{fb}$ to obtain a sampling voltage $V_{fb}$. $V_{fb}$ is input to a pulse width modulation (pulse width modulation, PWM) control circuit and an OVP circuit that are of a control protection circuit, where $V_{fb}$ can be used for feedback control of the PWM control circuit to adjust $V_{bulk}$, and also used for overvoltage protection of the OVP circuit. However, the PWM control circuit of the totem-pole PFC and the OVP circuit share the sampling voltage $V_{fb}$ of the output sampling circuit. Therefore, when the output sampling circuit is abnormal, causing a resistance value of $R_{fb}$ to decrease, neither the PWM control circuit nor the OVP circuit can work normally, and the totem-pole PFC outputs overvoltage, thus damaging an entire power supply.

SUMMARY

This application provides a power factor correction circuit and a power converter, so as to implement overvoltage protection on a totem-pole PFC circuit when an output sampling circuit is abnormal.

According to a first aspect, this application provides a power factor correction circuit, where the power factor correction PFC circuit includes an alternating current input circuit, a totem-pole PFC circuit, an input sampling circuit, an output sampling circuit, and a PFC control protection circuit. A first output terminal of the alternating current input circuit is respectively connected to a first input terminal of the totem-pole PFC circuit and a first input terminal of the input sampling circuit, and a second output terminal of the alternating current input circuit is respectively connected to a second input terminal of the totem-pole PFC circuit and a second input terminal of the input sampling circuit. An output terminal of the totem-pole PFC circuit is connected to an input terminal of the output sampling circuit, and an output terminal of the output sampling circuit is connected to a first input terminal of the PFC control protection circuit. A first output terminal and a second output terminal that are of the input sampling circuit are respectively connected to a second input terminal and a third input terminal that are of the PFC control protection circuit, and an output terminal of the PFC control protection circuit is connected to a third input terminal of the totem-pole PFC circuit. It should be understood that, the PFC control protection circuit is configured to control an output voltage of the totem-pole PFC circuit based on a first sampling voltage input at the first input terminal of the PFC control protection circuit, and the PFC control protection circuit is further configured to: when the alternating current input circuit outputs a negative voltage, perform overvoltage protection on the totem-pole PFC circuit based on a second sampling voltage input at the third input terminal. When the alternating current input circuit outputs a negative voltage, an output voltage at the first output terminal of the alternating current input circuit is less than an output voltage at the second output terminal of the alternating current input circuit.

In this application, when the alternating current input circuit outputs a negative voltage, it is determined, based on the second sampling voltage output at the second output terminal of the input sampling circuit, whether overvoltage occurs on the output voltage of the totem-pole PFC circuit, which can implement overvoltage protection on the totem-pole PFC circuit when the output sampling circuit is abnormal.

With reference to the first aspect, in a first possible implementation, the input sampling circuit includes a first channel of voltage divider resistor and a second channel of voltage divider resistor. The first channel of voltage divider resistor includes at least a first voltage divider resistor and a second voltage divider resistor that are connected in series between the first output terminal of the alternating current input circuit and a ground terminal, and a series connection point of the first voltage divider resistor and the second voltage divider resistor serves as the first output terminal of the input sampling circuit to connect to the second input terminal of the PFC control protection circuit. The second channel of voltage divider resistor includes at least a third voltage divider resistor and a fourth voltage divider resistor that are connected in series between the second output terminal of the alternating current input circuit and the ground terminal, and a series connection point of the third voltage divider resistor and the fourth voltage divider resistor serves as the second output terminal of the input sampling circuit to connect to the third input terminal of the PFC control protection circuit.

With reference to the first possible implementation of the first aspect, in a second possible implementation, the PFC control protection circuit includes a first overvoltage protection circuit and a pulse width modulation PWM control circuit. A first input terminal of the first overvoltage protection circuit serves as the third input terminal of the PFC control protection circuit to connect to the second output terminal of the input sampling circuit, an output terminal of the first overvoltage protection circuit is connected to an enabling terminal of the PWM control circuit, and an input terminal of the PWM control circuit serves as the first input terminal of the PFC control protection circuit to connect to the output terminal of the output sampling circuit. The first overvoltage protection circuit is configured to: when the alternating current input circuit outputs a negative voltage, if it is determined that the second sampling voltage is greater than or equal to a first voltage protection threshold, turn off output of the PWM control circuit to perform overvoltage protection on the totem-pole PFC circuit. The PWM control circuit is configured to control the output voltage of the totem-pole PFC circuit based on the first sampling voltage.

In this application, when the alternating current input circuit outputs a negative voltage, the first overvoltage protection circuit may determine, based on a size relationship between the second sampling voltage and the first voltage protection threshold, whether overvoltage occurs on the output voltage of the totem-pole PFC circuit, and when determining that overvoltage occurs on the output voltage of the totem-pole PFC circuit (that is, when the second sampling voltage is greater than or equal to the first voltage protection threshold, it may be determined that overvoltage occurs on the output voltage of the totem-pole PFC circuit), turns off the output of the PWM control circuit, to implement overvoltage protection on the totem-pole PFC circuit. The PWM control circuit is configured to control the output voltage of the totem-pole PFC circuit based on the first sampling voltage, so as to maintain stability of the output voltage of the totem-pole PFC circuit.

With reference to the first possible implementation of the first aspect, in a third possible implementation, the PFC control protection circuit includes a second overvoltage protection circuit and a PWM control circuit. A first input terminal of the second overvoltage protection circuit serves as the third input terminal of the PFC control protection circuit to connect to the second output terminal of the input sampling circuit, a second input terminal of the second overvoltage protection circuit and an input terminal of the PWM control circuit serve as the first input terminal of the PFC control protection circuit to connect to the output terminal of the output sampling circuit, and an output terminal of the second overvoltage protection circuit is connected to an enabling terminal of the PWM control circuit. The second overvoltage protection circuit is configured to: when the alternating current input circuit outputs a negative voltage, if it is determined that a voltage difference between the second sampling voltage and the first sampling voltage is greater than or equal to a second voltage protection threshold, turn off the output of the PWM control circuit to perform overvoltage protection on the totem-pole PFC circuit. The PWM control circuit is configured to control the output voltage of the totem-pole PFC circuit based on the first sampling voltage.

In this application, when the alternating current input circuit outputs a negative voltage, the second overvoltage protection circuit may determine, based on a size relationship between a voltage difference between the second sampling voltage and the first sampling voltage and the second voltage protection threshold, whether overvoltage occurs on the output voltage of the totem-pole PFC circuit, and when determining that overvoltage occurs on the output voltage of the totem-pole PFC circuit (that is, when the voltage difference between the second sampling voltage and the first sampling voltage is greater than or equal to the second voltage protection threshold, it may be determined that overvoltage occurs on the output voltage of the totem-pole PFC circuit), turns off the output of the PWM control circuit, to implement overvoltage protection on the totem-pole PFC circuit. The PWM control circuit is configured to control the output voltage of the totem-pole PFC circuit based on the first sampling voltage, so as to maintain stability of the output voltage.

With reference to the second possible implementation of the first aspect or the third possible implementation of the first aspect, in a fourth possible implementation, the PFC control protection circuit further includes a phase detection circuit. A first input terminal of the phase detection circuit serves as the third input terminal of the PFC control protection circuit to connect to the second output terminal of the input sampling circuit. A second input terminal of the phase detection circuit serves as the second input terminal of the PFC control protection circuit to connect to the first output terminal of the input sampling circuit, and an output terminal of the phase detection circuit is connected to a second input terminal of the first overvoltage protection circuit or a third input terminal of the second overvoltage protection circuit. The phase detection circuit is configured to detect that the alternating current input circuit outputs a negative voltage or outputs a positive voltage.

In this application, the phase detection circuit may determine that the alternating current input circuit outputs a negative voltage or outputs a positive voltage based on output voltages of the first output terminal and the second output terminal of the input sampling circuit.

With reference to the fourth possible implementation of the first aspect, in a fifth possible implementation, the phase detection circuit includes a first differential amplifier circuit and a first comparator circuit. An in-phase input terminal of the first differential amplifier circuit serves as the second input terminal of the phase detection circuit to connect to the first output terminal of the input sampling circuit, and an inverting input terminal of the first differential amplifier circuit serves as the first input terminal of the phase detection circuit to connect to the second output terminal of the input sampling circuit. An output terminal of the first differential amplifier circuit is connected to an inverting input terminal of the first comparator circuit, and an output terminal of the first comparator circuit serves as the output terminal of the phase detection circuit to connect to the second input terminal of the first overvoltage protection circuit or the third input terminal of the second overvoltage protection circuit.

With reference to the second possible implementation of the first aspect, in a sixth possible implementation, the first overvoltage protection circuit includes a second comparator circuit and a first logic AND gate circuit. An in-phase input terminal of the second comparator circuit serves as the first input terminal of the first overvoltage protection circuit to connect to the second output terminal of the input sampling circuit. An output terminal of the second comparator circuit is connected to a first input terminal of the first logic AND gate circuit, a second input terminal of the first logic AND gate circuit serves as a second input terminal of the first overvoltage protection circuit to connect to an output terminal of a phase detection circuit, and an output terminal of the first logic AND gate circuit serves as the output terminal of the first overvoltage protection circuit to connect to the enabling terminal of the PWM control circuit.

With reference to the third possible implementation of the first aspect, in a seventh possible implementation, the second overvoltage protection circuit includes a second differential amplifier circuit, a third comparator circuit, and a second logic AND gate circuit. An in-phase input terminal of the second differential amplifier circuit serves as the first input terminal of the second overvoltage protection circuit to connect to the second output terminal of the input sampling circuit, an inverting input terminal of the second differential amplifier circuit serves as the second input terminal of the second overvoltage protection circuit to connect to the output terminal of the output sampling circuit, an output terminal of the second differential amplifier circuit is connected to an in-phase input terminal of the third comparator, an output terminal of the third comparator is connected to a first input terminal of the second logic AND gate circuit, a second input terminal of the second logic AND gate circuit serves as a third input terminal of the second overvoltage protection circuit to connect to an output terminal of a phase detection circuit, and an output terminal of the second logic AND gate circuit serves as the output terminal of the second overvoltage protection circuit to connect to the enabling terminal of the PWM control circuit.

With reference to the sixth possible implementation of the first aspect or the seventh possible implementation of the first aspect, in an eighth possible implementation, the first overvoltage protection circuit or the second overvoltage protection circuit further includes a delay circuit. The output terminal of the second comparator circuit or the output terminal of the third comparator circuit is connected to an input terminal of the delay circuit, and an output terminal of the delay circuit is connected to the first input terminal of the first logic AND gate circuit or the second logic AND gate circuit.

In this application, by connecting the delay circuit, that an overvoltage protection function of the first overvoltage protection circuit or the second overvoltage protection circuit may be mistakenly triggered in some cases (for example, a switch closing moment in the totem-pole PFC circuit) can be avoided.

With reference to any one of the first aspect to the eighth possible implementation of the first aspect, in a ninth possible implementation, the output sampling circuit includes a third channel of voltage divider resistor. The third channel of voltage divider resistor includes at least a fifth voltage divider resistor and a sixth voltage divider resistor that are connected in series between the output terminal of the totem-pole PFC circuit and the ground terminal, and a series connection point of the fifth voltage divider resistor and the sixth voltage divider resistor serves as the output terminal of the output sampling circuit to connect to the first input terminal of the PFC control protection circuit.

According to a second aspect, this application provides a power converter, and the power converter includes the power factor correction circuit provided in any one of the first aspect to the ninth possible implementation of the first aspect and a direct current DC/DC converter, where an alternating current input circuit of the power factor correction circuit is connected to an alternating current power supply, and an output terminal of a totem-pole PFC circuit of the power factor correction circuit is connected to an output terminal of the power converter by using a DC/DC converter.

With reference to the second aspect, in a first possible implementation, the power converter further includes an electromagnetic interference EMI filtering module, where the alternating current input circuit of the power factor correction circuit is connected to the alternating current power supply by using the EMI filtering module. That is, one end of the EMI filtering module is connected to the alternating current power supply, and the other end of the EMI filtering module is connected to the alternating current input circuit of the power factor correction circuit.

With reference to the second aspect or the first possible implementation of the second aspect, in a second possible implementation, the DC/DC converter is an isolated DC/DC converter, and a step-down ratio of the DC/DC converter is determined by an output terminal voltage of the totem-pole PFC circuit and an output terminal voltage of the power converter.

In this application, when the alternating current input circuit outputs a negative voltage, it is determined, based on the second sampling voltage output at the second output terminal of the input sampling circuit, whether overvoltage occurs on the output voltage of the totem-pole PFC circuit, which can implement overvoltage protection on the totem-pole PFC circuit when the output sampling circuit is abnormal.

BRIEF DESCRIPTION OF DRAWINGS

FIG. 7 is a schematic diagram of an operating principle of a totem-pole PFC circuit;

DESCRIPTION OF EMBODIMENTS

Figure 1:
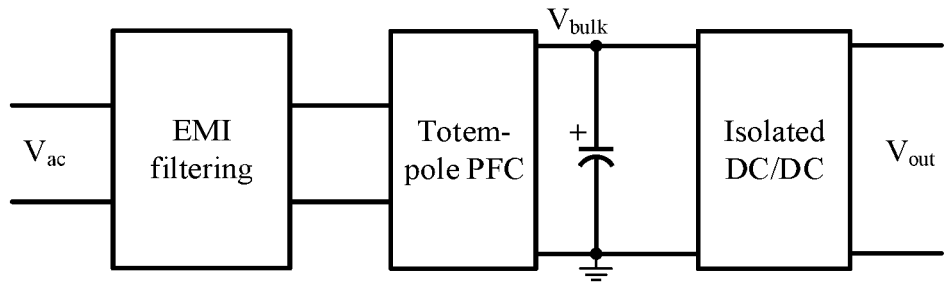
FIG. 1 is a schematic diagram of an operating principle of a power converter.

A PFC circuit provided in this application is applicable to various AC/DC power converters or power converters. For example, the power converter or the power converter may include a power adapter, a charger, or the like of various electronic devices, which is not limited herein. The foregoing electronic devices may be electronic products based on electrical energy. For example, various electronic devices may include a desktop computer, a laptop computer, a television set, a game machine, a smartphone, a personal digital assistant (personal digital assistant, PDA), a mobile Internet device (mobile Internet device, MID), an intelligent wearable device, and the like. This is not limited herein.

It is not difficult to understand that a power supply is used as an energy supply end of an electronic device, and stable operation of the power supply is a prerequisite for ensuring normal operation of the electronic device. In a power supply system, conversion efficiency of the power supply is very important. Currently, an efficient conversion circuit of the power supply mainly includes a passive power factor correction (passive power factor correction, PPFC) circuit and active power factor correction (active power factor correction, APFC). As a type of the APFC circuit, a totem-pole PFC circuit has a rectifier filtering function and a power factor correction function, and is widely used in recent years. It should be understood that a power factor refers to a ratio of active power to apparent power of an alternating current circuit. Generally, a larger power factor indicates that a power supply can be further fully utilized, that is, higher conversion efficiency of the power supply.

In a totem-pole PFC power supply solution, to prevent an output voltage at an output terminal of the totem-pole PFC circuit from encountering overvoltage, thereby damaging an entire power supply, an OVP circuit usually needs to be added to a PWM control circuit of the totem-pole PFC circuit. It should be understood that the PWM control circuit may be configured to adjust an output voltage of the totem-pole PFC circuit based on a sampling voltage that is sampled at the output terminal of the totem-pole PFC circuit. For example, when the PWM control circuit detects that the sampling voltage decreases, the PWM control circuit may adjust the totem-pole PFC circuit to increase the output voltage. When the PWM control circuit detects that the sampling voltage increases, the PWM control circuit may adjust the totem-pole PFC circuit to decrease the output voltage. The OVP circuit may be configured to determine, based on the sampling voltage that is sampled at the output terminal of the totem-pole PFC circuit, whether to perform overvoltage protection on the totem-pole PFC circuit. Generally, when the OVP circuit detects that the sampling voltage is greater than or equal to a voltage protection threshold, it may be determined that overvoltage occurs on the output voltage at the output terminal of the totem-pole PFC circuit. Therefore, the OVP circuit can turn off PWM signal output of the PWM control circuit, so as to implement overvoltage protection on the totem-pole PFC circuit.

Figure 2:
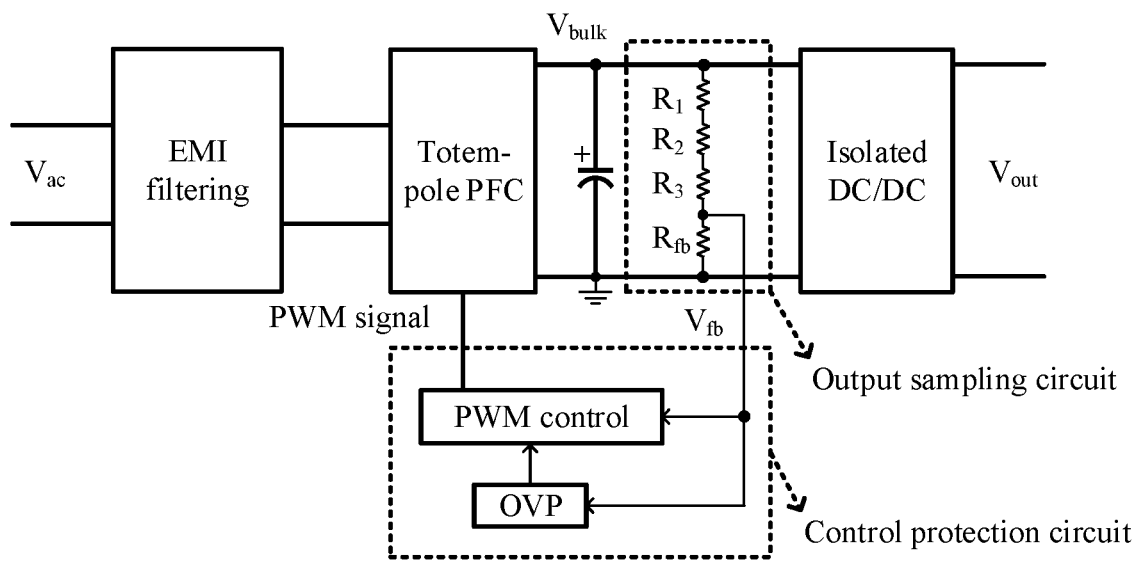
FIG. 2 is a schematic diagram of a structure of a PFC circuit.

It is not difficult to understand that, to implement overvoltage protection on the totem-pole PFC circuit, first, the output voltage at the output terminal of the totem-pole PFC circuit needs to be sampled to obtain a sampling voltage. As shown in FIG. 2, in some feasible implementations, an output sampling circuit including one channel of voltage divider resistor may be connected to an output terminal of the totem-pole PFC circuit, so as to sample an output voltage at the output terminal of the totem-pole PFC circuit based on the output sampling circuit, to obtain a sampling voltage. By respectively inputting the sampling voltage into the PWM control circuit and the OVP circuit, the sampling voltage may be simultaneously used for feedback control of the PWM control circuit and overvoltage protection of the OVP circuit. It is not difficult to understand that the PWM control circuit and the OVP circuit share a sampling voltage obtained based on a same channel of voltage divider resistor. Therefore, when an actual output voltage of the totem-pole PFC circuit is excessive, the channel of voltage divider resistor is abnormal (for example, a decrease in Rø), resulting in a decrease in the sampling voltage, the PWM control circuit adjusts the totem-pole PFC circuit based on the sampling voltage to further increase the output voltage. At the same time, the OVP circuit cannot determine, based on the sampling voltage, that overvoltage occurs on the actual output voltage (that is, the OVP circuit detects that the sampling voltage is less than the voltage protection threshold, and the OVP circuit may mistakenly believe that overvoltage does not occur on the output voltage). Therefore, the OVP circuit cannot work normally, and a power supply may be damaged.

Figure 3:
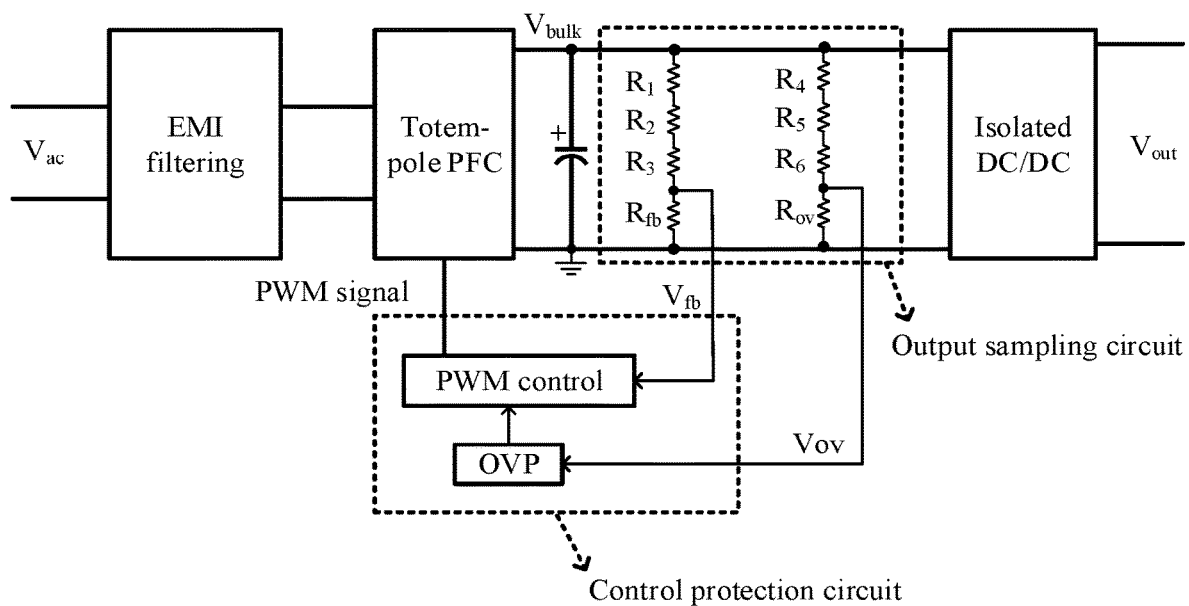
FIG. 3 is a schematic diagram of another structure of a PFC circuit.

Based on this, to resolve a problem that when the PWM control circuit and the OVP circuit share a sampling voltage of a same channel of voltage divider resistor to respectively perform PWM control and overvoltage protection, a sampling voltage decreases when the output sampling circuit is abnormal, which makes that the OVP circuit cannot work normally. In some feasible implementations, an output sampling circuit including two channels of voltage divider resistors may be connected to the output terminal of the totem-pole PFC circuit, an output voltage of the totem-pole PFC circuit is sampled based on the output sampling circuit including the two channels of voltage divider resistors to obtain two sampling voltages, and then the two obtained sampling voltages are respectively used in the PWM control circuit and the OVP circuit to resolve the foregoing problem. That is, a sampling voltage obtained based on one channel of voltage divider resistor in the foregoing two channels of voltage divider resistors may be used for feedback control of the PWM control circuit, and a sampling voltage obtained based on the other channel of voltage divider resistor in the foregoing two channels of voltage divider resistors is used for overvoltage protection of the OVP circuit. For ease of understanding, with reference to FIG. 3, FIG. 3 is a schematic diagram of another structure of a PFC circuit. As shown in FIG. 3, an output sampling circuit including two channels of independent voltage divider resistors is connected to the output terminal of the totem-pole PFC circuit, and output voltages may be respectively sampled by using the two channels of independent voltage divider resistors to obtain sampling voltages. A sampling voltage obtained based on one channel of voltage divider resistor in the two channels of voltage divider resistors may be used for feedback control of the PWM control circuit, and a sampling voltage obtained based on the other channel of voltage divider resistor in the two channels of voltage divider resistors is used for overvoltage protection of the OVP circuit.

It is not difficult to understand that the output voltage at the output terminal of the totem-pole PFC circuit is a high-voltage direct current bus voltage. Therefore, two channels of voltage divider resistors are added to the output terminal of the totem-pole PFC circuit to respectively sample the output voltage, which may lead to a case that a loss of a sampling circuit is multiplied, and conversion efficiency of a power supply is reduced. It should be understood that, in the totem-pole PFC circuit, a PWM signal may be output by using the PWM control circuit, so as to control on/off of switches in the totem-pole PFC circuit. The PWM control circuit can usually determine an operating state of the alternating current input circuit based on a sampling voltage sampled by the input sampling circuit, and then output different PWM signals for PWM control. Based on this, another PFC circuit is proposed in this application. By connecting an output sampling circuit including one channel of voltage divider resistor to the output terminal of the totem-pole PFC circuit, and by reusing the input sampling circuit to sample an output voltage, the PFC circuit may use a sampling voltage obtained based on the output sampling circuit for feedback control of the PWM control circuit, and when the alternating current input circuit outputs a negative voltage, use a sampling voltage obtained based on the input sampling circuit for overvoltage protection of the OVP circuit.

Clearly, compared with the PFC circuit provided in FIG. 2, the PFC circuit in this application may resolve a problem that when the PWM control circuit and the OVP circuit share a sampling voltage sampled by the output sampling circuit including one channel of voltage divider resistor, the OVP circuit cannot work normally when the output sampling circuit is abnormal. Compared with the PFC circuit provided in FIG. 3, in this application, there is no need to additionally connect to one channel of voltage divider resistor at the output terminal of the totem-pole PFC circuit, so as to resolve an overvoltage protection problem when the output sampling circuit is abnormal. By using this application, on one hand, overvoltage protection for the totem-pole PFC circuit may be implemented when the output sampling circuit is abnormal, and on the other hand, a quantity of components connected to the output terminal of the totem-pole PFC circuit may be reduced, so as to reduce a loss of a sampling circuit, and improve conversion efficiency of a power supply.

Figure 4:
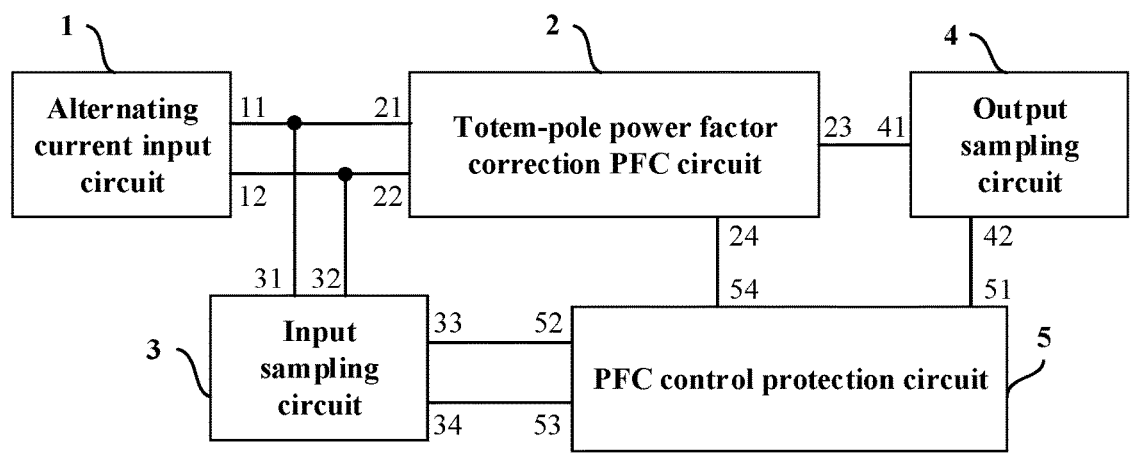
FIG. 4 is a schematic diagram of a structure of a PFC circuit according to this application.

With reference to FIG. 4, FIG. 4 is a schematic diagram of a structure of a PFC circuit according to this application. As shown in FIG. 4, the PFC circuit includes an alternating current input circuit 1, a totem-pole PFC circuit 2, an input sampling circuit 3, an output sampling circuit 4, and a PFC control protection circuit 5. A first output terminal 11 of the alternating current input circuit 1 is respectively connected to a first input terminal 21 of the totem-pole PFC circuit and a first input terminal 31 of the input sampling circuit, and a second output terminal 12 of the alternating current input circuit is respectively connected to a second input terminal 22 of the totem-pole PFC circuit and a second input terminal 32 of the input sampling circuit. An output terminal 23 of the totem-pole PFC circuit is connected to an input terminal 41 of the output sampling circuit, and an output terminal 42 of the output sampling circuit is connected to a first input terminal 51 of the PFC control protection circuit. A first output terminal 33 and a second output terminal 34 that are of the input sampling circuit are respectively connected to a second input terminal 52 and a third input terminal 53 that are of the PFC control protection circuit, and an output terminal 54 of the PFC control protection circuit is connected to a third input terminal 24 of the totem-pole PFC circuit.

The PFC control protection circuit 5 is configured to control an output voltage of the totem-pole PFC circuit 2 based on a first sampling voltage input at the first input terminal 51 of the PFC control protection circuit, and the PFC control protection circuit 5 is further configured to: when the alternating current input circuit 1 outputs a negative voltage, perform overvoltage protection on the totem-pole PFC circuit 2 based on a second sampling voltage input at the third input terminal 53 of the PFC control protection circuit. It should be understood that when an output voltage at the first output terminal 11 of the alternating current input circuit 1 is less than an output voltage at the second output terminal 12 of the alternating current input circuit, the alternating current input circuit outputs a negative voltage.

Figure 5:
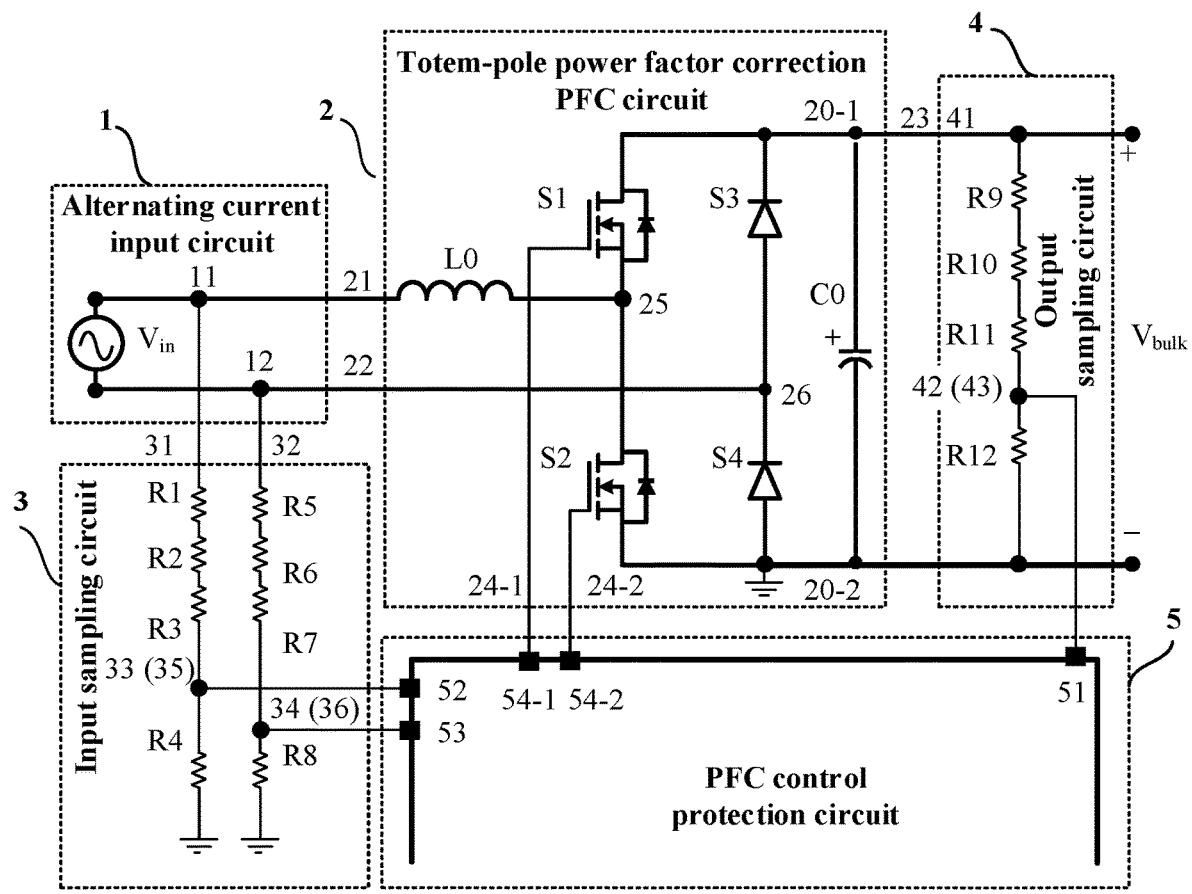
FIG. 5 is a schematic diagram of another structure of a PFC circuit according to this application.

Specifically, with reference to FIG. 5, FIG. 5 is a schematic diagram of another structure of a PFC circuit according to this application. As shown in FIG. 5, the totem-pole PFC circuit 2 may include a first bridge arm unit, a second bridge arm unit, a boost inductor L0, and a filter capacitor C0. The first bridge arm unit, the second bridge arm unit, and the filter capacitor C0 are connected in parallel between a first parallel connection point 20-1 and a second parallel connection point 20-2, and the second parallel connection point 20-2 is connected to a ground terminal. As shown in FIG. 5, the first bridge arm unit may include a first switch S1 and a second switch S2 that are connected in series in a same direction, and the second bridge arm unit may include a third switch S3 and a fourth switch S4 that are connected in series in a same direction. One end of the boost inductor L0 is connected to a series connection point 25 between the first switch S1 and the second switch S2, and the other end of the boost inductor L0 serves as the first input terminal 21 of the totem-pole PFC circuit to connect to the first output terminal 11 of the alternating current input circuit. A series connection point 26 of the third switch S3 and the fourth switch S4 serves as the second input terminal 22 of the totem-pole PFC circuit to connect to the second output terminal 12 of the alternating current input circuit. The first parallel connection point 20-1 of the totem-pole PFC circuit serves as the output terminal 23 of the totem-pole PFC circuit to connect to the input terminal 41 of the output sampling circuit.

It should be understood that the first switch S1 and the second switch S2 each may be a metal-oxide-semiconductor field-effect transistor (metal-oxide-semiconductor field-effect transistor, MOSFET) or an insulated gate bipolar transistor (insulated gate bipolar transistor, IGBT) made of a material such as a silicon semiconductor material (silicon, Si) or silicon carbide (silicon carbide, SiC) of a third generation wide band-gap semiconductor material or gallium nitride (gallium nitride, GaN). The third switch S3 and the fourth switch S4 each may be a MOSFET, an IGBT, a diode, or the like made of a material such as Si, SiC, or GaN, which is not limited herein.

When the first switch S1 and the second switch S2 are MOSFETs, and the third switch S3 and the fourth switch S4 are diodes, for circuit structures thereof, refer to FIG. 5. A gate of the first switch S1 and a gate of the second switch S2 serve as third input terminals 24 (that is, 24-1 and 24-2) of the totem-pole PFC circuit to connect to output terminals 54 (that is, 54-1 and 54-2) of a PFC control circuit.

Figure 6:
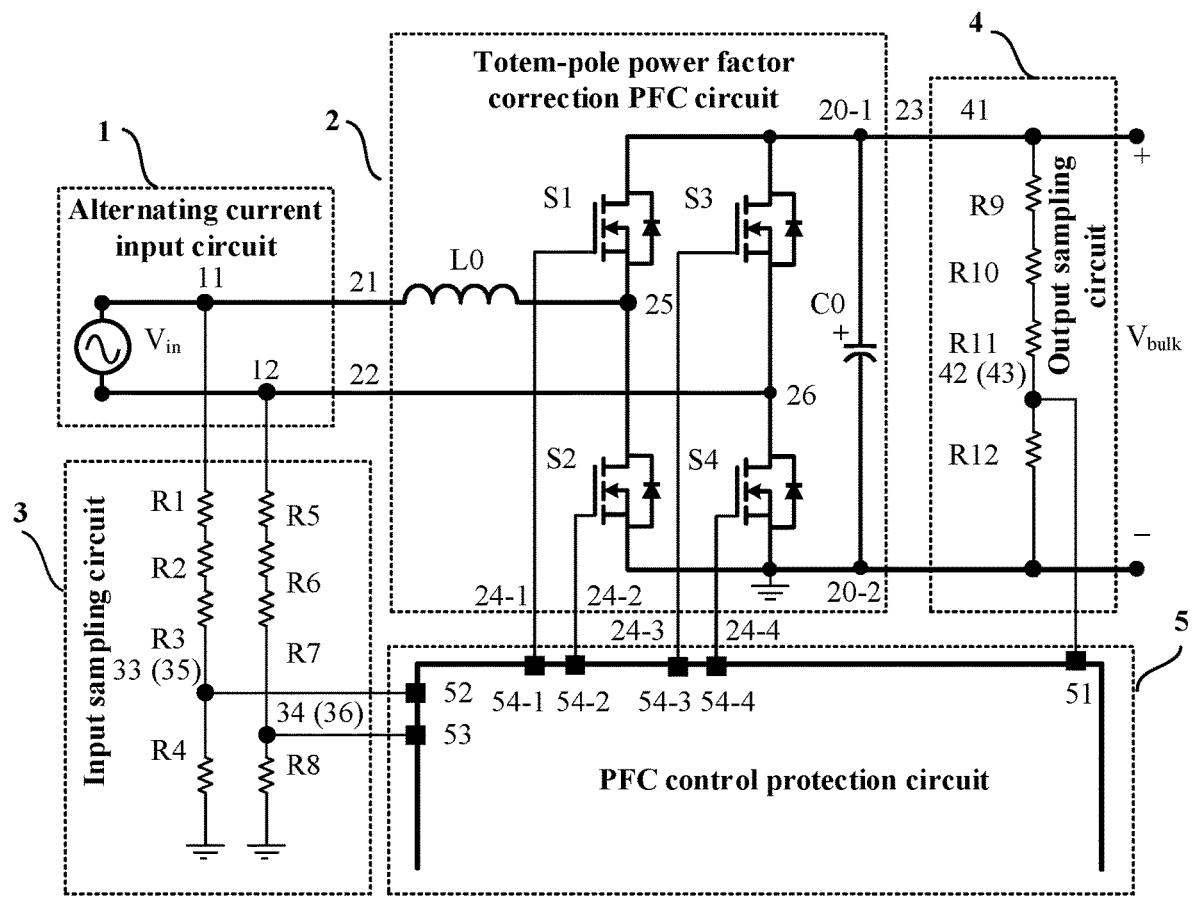
FIG. 6 is a schematic diagram of another structure of a PFC circuit according to this application.

Further, with reference to FIG. 6, FIG. 6 is a schematic diagram of another structure of a PFC circuit according to this application. As shown in FIG. 6, when the first switch S1, the second switch S2, the third switch S3, and the fourth switch S4 are all MOSFETs, gates of the first switch S1, the second switch S2, the third switch S3, and the fourth switch S4 may serve as third input terminals 24 (that is, 24-1, 24-2, 24-3, and 24-4) of the totem-pole PFC circuit to connect to output terminals 54 (that is, 54-1, 54-2, 54-3, and 54-5) of the PFC control circuit. For ease of description, the following uses an example in which the first switch S1 and the second switch S2 are MOSFETs, and the third switch S3 and the fourth switch S4 are diodes.

It should be understood that the totem-pole PFC circuit mainly includes four operating states. Specifically, with reference to FIG. 7, FIG. 7 is a schematic diagram of an operating principle of a totem-pole PFC circuit according to this application. As shown in FIG. 7, when the alternating current input circuit outputs a positive voltage, that is, when the output voltage at the first output terminal 11 of the alternating current input circuit 1 is greater than the output voltage at the second output terminal 12 of the alternating current input circuit, the boost inductor L0, the switches S2 and S4, and the filter capacitor C0 may form an energy storage loop by closing the switch S2 and opening the switch S1, and in this case, the boost inductor L0 is charged. After the boost inductor L0 is charged, the boost inductor L0 and the switches S1 and S4 form a freewheeling circuit by closing the switch S1 and opening the switch S2, so as to release energy on the boost inductor L0. Correspondingly, when the alternating current input circuit 1 outputs a positive voltage, that is, when the output voltage at the first output terminal 11 of the alternating current input circuit is less than the output voltage at the second output terminal 12 of the alternating current input circuit, the switches S3 and S1, the boost inductor L0, and the filter capacitor C0 may form an energy storage circuit by closing the switch S1 and opening the switch S2, and in this case, the boost inductor L0 is charged. After the boost inductor L0 is charged, the switches S3 and S2, the boost inductor L0, and the filter capacitor C0 may form a freewheeling circuit by closing the switch S2 and opening the switch S1, so as to release energy on the boost inductor L0.

It may be learned from FIG. 7 that when the alternating current input circuit 1 outputs a negative voltage, because a diode S3 is always in an on state, in this case, the output voltage at the second output terminal 12 of the alternating current input circuit 1 is equal to an output voltage at an output terminal of the totem-pole PFC circuit 2. Therefore, when the alternating current input circuit 1 outputs a negative voltage, a sampling voltage may be obtained by sampling the output voltage at the second output terminal 12 of the alternating current input circuit by using an input sampling circuit (for ease of description, a second sampling voltage is used as an example for description). The PFC control protection circuit may perform overvoltage protection on the totem-pole PFC circuit based on the obtained second sampling voltage.

Specifically, the input sampling circuit 3 may include a first channel of voltage divider resistor and a second channel of voltage divider resistor. The first channel of voltage divider resistor includes at least a first voltage divider resistor and a second voltage divider resistor that are connected in series between the first output terminal of the alternating current input circuit and a ground terminal. A series connection point of the first voltage divider resistor and the second voltage divider resistor serves as the first output terminal of the input sampling circuit to connect to the second input terminal of the PFC control protection circuit. The second channel of voltage divider resistor includes at least a third voltage divider resistor and a fourth voltage divider resistor that are connected in series between a second output terminal of the alternating current input circuit and a ground terminal. A series connection point of the third voltage divider resistor and the fourth voltage divider resistor serves as a second output terminal of the input sampling circuit to connect to a third input terminal of the PFC control protection circuit. It should be understood that a quantity of voltage divider resistors included in the first channel of voltage divider resistor and a quantity of voltage divider resistors included in the second channel of voltage divider resistor may be the same or different, and resistance values of voltage divider resistors may be the same or different. This is specifically determined based on an actual application scenario, and is not limited herein.

For example, with reference to FIG. 5 together, the input sampling circuit 3 includes a first channel of voltage divider resistor and a second channel of voltage divider resistor. The first channel of voltage divider resistor may include voltage divider resistors R1, R2, R3, and R4, and the second channel of voltage divider resistor may include voltage divider resistors R5, R6, R7, and R8. The voltage divider resistors R1, R2, R3, and R4 are connected in series between the first output terminal 11 of the alternating current input circuit 1 and the ground terminal, and the voltage divider resistors R5, R6, R7, and R8 are connected in series between the second output terminal 12 of the alternating current input circuit 1 and the ground terminal. A series connection point 35 of the first channel of voltage divider resistor serves as the first output terminal 33 of the input sampling circuit to connect to the second input terminal 52 of the PFC control protection circuit, and a series connection point 36 of the second channel of voltage divider resistor serves as the second output terminal 34 of the input sampling circuit to connect to the third input terminal 53 of the PFC control protection circuit. That is, an output voltage at the first output terminal 33 of the input sampling circuit 3 is a voltage at two ends of the voltage divider resistor R4 (for ease of description, a third sampling voltage is used as an example for description). An output voltage at the second output terminal 34 of the input sampling circuit 3 is a voltage at two ends of the sampling resistor R8 (for ease of description, the second sampling voltage is used as an example for description).

Specifically, the output sampling circuit 4 includes one channel of voltage divider resistor (for ease of description, the third channel of voltage divider resistor is used as an example for description). The third channel of voltage divider resistor includes at least a fifth voltage divider resistor and a sixth voltage divider resistor that are connected in series between a first output terminal of the totem-pole PFC circuit and a second output terminal of the totem-pole PFC circuit. A series connection point of the fifth voltage divider resistor and the sixth voltage divider resistor serves as the output terminal of the output sampling circuit to connect to the first input terminal of the PFC control protection circuit. It should be understood that a quantity of voltage divider resistors included in the third channel of voltage divider resistor may be determined based on an actual application scenario, which is not limited herein. For ease of understanding, this application uses an example in which a quantity of voltage divider resistors included in the first channel of voltage divider resistor, the second channel of voltage divider resistor, and the third channel of voltage divider resistor and resistance values of the voltage divider resistors are the same for description.

For example, with reference to FIG. 5 together, the output sampling circuit 4 includes the third channel of voltage divider resistor. The third channel of voltage divider resistor may be composed of voltage divider resistors R9, R10, R11, and R12. The voltage divider resistors R9, R10, R11, and R12 are connected in series between the output terminal 23 of the totem-pole PFC circuit and the ground terminal. A series connection point 43 of the third channel of voltage divider resistor serves as the output terminal 42 of the output sampling circuit to connect to the first input terminal 51 of the PFC control protection circuit. That is, an output voltage at an output terminal of the output sampling circuit 4 is a voltage at two ends of the voltage divider resistor R12 (for ease of description, the first sampling voltage is used as an example for description).

It should be understood that, on one hand, the PFC control protection circuit is configured to control an output voltage $V_{bulk}$ of the totem-pole PFC circuit based on a first sampling voltage input at the first input terminal 51 of the PFC control protection circuit, and on the other hand, the PFC control protection circuit is further configured to: when the alternating current input circuit 1 outputs a negative voltage, perform overvoltage protection on the totem-pole PFC circuit based on a second sampling voltage input at the third input terminal 53. The following describes a circuit structure of the PFC control protection circuit in this application in detail with reference to FIG. 8 to FIG. 18.

Figure 8:
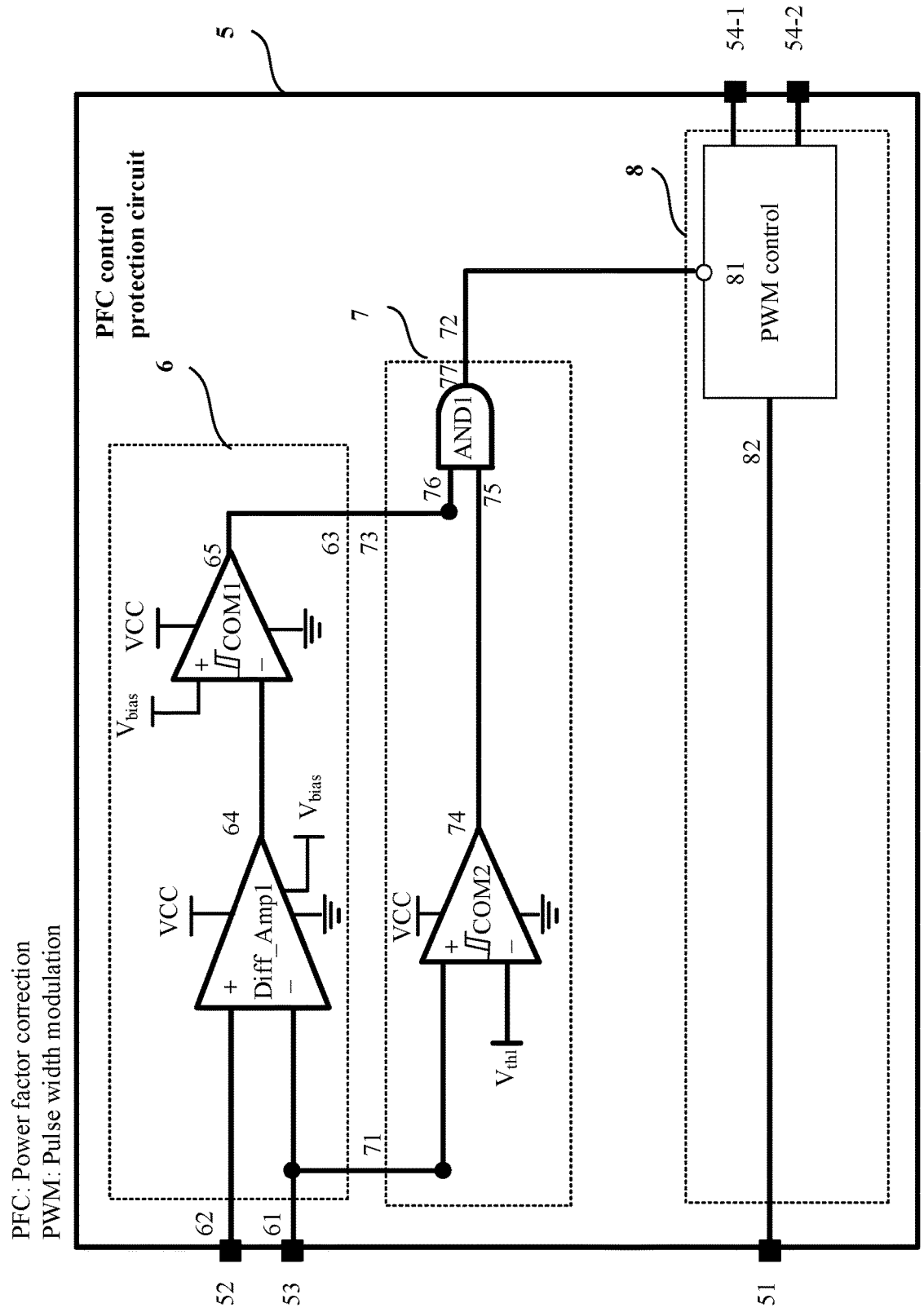
FIG. 8 is a schematic diagram of a structure of a PFC control protection circuit according to this application.

PFC control protection circuit structure 1:

In some feasible implementations, the PFC control protection circuit may include an overvoltage protection circuit (for ease of description, a first overvoltage protection circuit is used as an example for description) and a PWM control circuit. With reference to FIG. 8, FIG. 8 is a schematic diagram of a structure of a PFC control protection circuit according to this application. A first input terminal 71 of a first overvoltage protection circuit 7 serves as the third input terminal 53 of the PFC control protection circuit to connect to the second output terminal 34 of the input sampling circuit, and an output terminal 72 of the first overvoltage protection circuit is connected to an enabling terminal 81 of the PWM control circuit. An input terminal 82 of the PWM control circuit serves as the first input terminal 51 of the PFC control protection circuit to connect to the output terminal 42 of the output sampling circuit. The first overvoltage protection circuit 7 is configured to: when the alternating current input circuit 1 outputs a negative voltage, control, based on the second sampling voltage, enabling on the PWM control circuit to perform overvoltage protection on the totem-pole PFC circuit. That is, when the alternating current input circuit 1 outputs a negative voltage, if the first overvoltage protection circuit detects that the second sampling voltage is greater than or equal to a voltage protection threshold (for ease of description, a first voltage protection threshold is used as an example for description), the first overvoltage protection circuit may turn off output of the PWM control circuit, so as to implement overvoltage protection on the totem-pole PFC circuit. A PWM control circuit 8 is configured to control an output voltage $V_{bulk}$ of the totem-pole PFC circuit 2 based on the first sampling voltage.

Optionally, in some feasible implementations, the PFC control protection circuit may further include a phase detection circuit. With reference to FIG. 8 together, a first input terminal 61 of a phase detection circuit 6 serves as the third input terminal 53 of the PFC control protection circuit to connect to the second output terminal 34 of the input sampling circuit, and a second input terminal 62 of the phase detection circuit serves as the second input terminal 52 of the PFC control protection circuit to connect to the first output terminal 33 of the input sampling circuit. An output terminal 63 of the phase detection circuit 6 is connected to a second input terminal 73 of the first overvoltage protection circuit. The phase detection circuit 6 is configured to detect that the alternating current input circuit outputs a negative voltage or outputs a positive voltage. Specifically, the phase detection circuit 6 may include a differential amplifier circuit (for ease of description, a first differential amplifier circuit is used as an example for description) and a comparator circuit (for ease of description, a first comparator circuit is used as an example for description). An in-phase input terminal of the first differential amplifier circuit Diff_Amp1 serves as the second input terminal 62 of the phase detection circuit 6 to connect to the first output terminal 33 of the input sampling circuit, and an inverting input terminal of the first differential amplifier circuit Diff_Amp1 serves as the first input terminal 61 of the phase detection circuit to connect to the second output terminal 34 of the input sampling circuit. An output terminal 64 of the first differential amplifier circuit Diff_Amp1 is connected to an inverting input terminal of the first comparator circuit COM1, and an output terminal 65 of the first comparator circuit COM1 serves as the output terminal 63 of the phase detection circuit to connect to the second input terminal 73 of the first overvoltage protection circuit. It should be understood that Vbias in FIG. 8 is a bias voltage. The bias voltage Vbias is introduced in the first differential amplifier circuit, so that an output voltage at the output terminal 64 of the first differential amplifier circuit can be raised as a whole.

Figure 9:
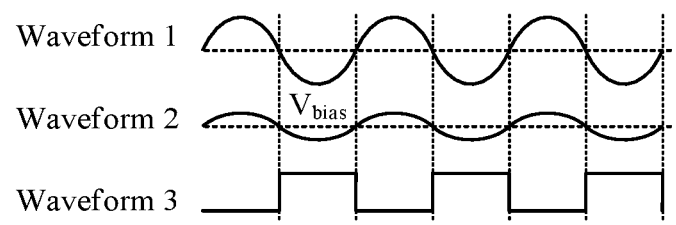
FIG. 9 is a working waveform graph of a phase detection circuit according to this application.

For example, with reference to FIG. 9, FIG. 9 is a working waveform graph of a phase detection circuit according to this application. As shown in FIG. 9, a waveform 1 is a signal waveform graph of an output terminal of an alternating current input circuit. A waveform 2 is a signal waveform graph of an output terminal of the first differential amplifier circuit Diff_Amp1. A waveform 3 is a signal waveform graph of an output terminal of the first comparator circuit COM1. It can be learned from the waveform 1 and the waveform 2 in FIG. 9, that the bias voltage Vbias is introduced in the first differential amplifier circuit, so that an output voltage at the output terminal of the first differential amplifier circuit Diff_Amp1 can be raised as a whole. It can be learned from the waveform 1 and the waveform 3 in FIG. 9 that when the output terminal of the alternating current input circuit outputs a positive voltage, an output signal at the output terminal of the first comparator circuit COM1 is set to low, and when the output terminal of the alternating current input circuit outputs a negative voltage, the output signal at the output terminal of the first comparator circuit COM1 is set to high. That is, by detecting an output state (high or low) of the output signal at the output terminal of the first comparator circuit COM1, it may be determined that the output voltage at the output terminal of the alternating current input circuit is to output a positive voltage or a negative voltage.

Further, the first overvoltage protection circuit may include a comparator circuit (for ease of description, a second comparator circuit is used as an example for description) and a logic AND gate circuit (for ease of description, a first logic AND gate circuit is used as an example for description). With reference to FIG. 8 together, an in-phase input terminal of the second comparator circuit COM2 serves as the first input terminal 71 of the first overvoltage protection circuit 7 to connect to the second output terminal 34 of the input sampling circuit. An output terminal 74 of the second comparator circuit COM2 is connected to a first input terminal 75 of the first logic AND gate circuit AND1, a second input terminal 76 of the first logic AND gate circuit AND1 serves as the second input terminal 73 of the first overvoltage protection circuit to connect to the output terminal 63 of the phase detection circuit. An output terminal 77 of the first logic AND gate circuit serves as the output terminal 72 of the first overvoltage protection circuit to connect to the enabling terminal 81 of the PWM control circuit. It should be understood that $V_{th1}$ at an inverting input terminal of the second comparator circuit COM2 in FIG. 8 is a voltage protection threshold. When a second sampling voltage input at the in-phase input terminal of the second comparator circuit COM2 is greater than or equal to the voltage protection threshold $V_{th1}$, an output signal of the second comparator circuit COM2 is set to high. Therefore, when and only when input signals of the first input terminal 75 and the second input terminal 76 of the first logic AND gate circuit AND1 are set to high (that is, the alternating current input circuit outputs a negative voltage and the second sampling voltage is greater than or equal to the voltage protection threshold $V_{th1}$), an output signal at the output terminal 77 of the first logic AND gate circuit AND1 is set to high. Further, the PWM control circuit may turn off PWM signal output at the output terminal of the PWM control circuit based on that an output signal at the output terminal of the first overvoltage protection circuit is set to high, so as to implement overvoltage protection on the totem-pole PFC circuit.

Figure 10:
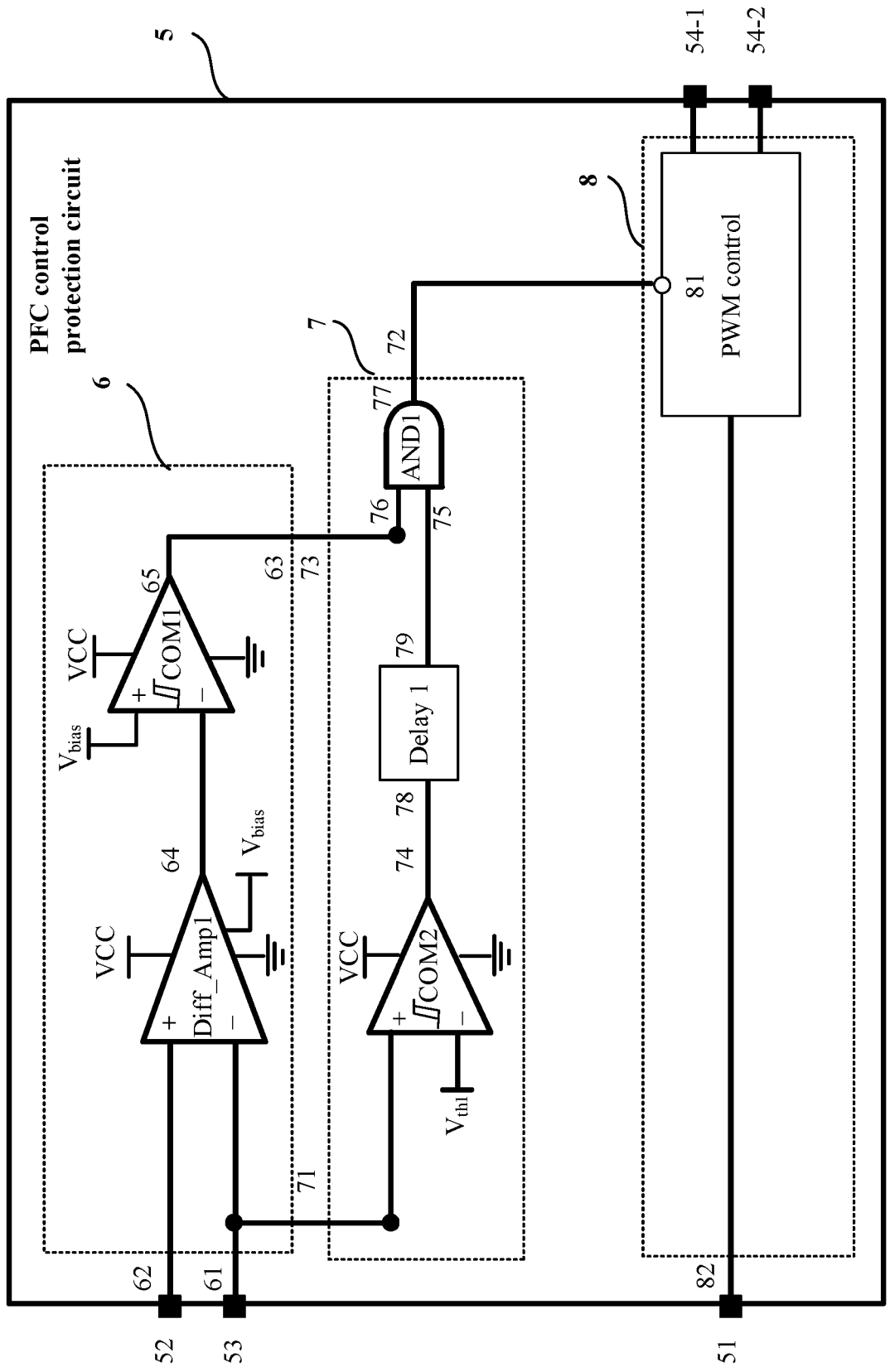
FIG. 10 is a schematic diagram of another structure of a PFC control protection circuit according to this application.

Optionally, in some feasible implementations, the first overvoltage protection circuit may further include a delay circuit (for ease of description, a first delay circuit is used as an example for description). The second comparator circuit is connected to the first input terminal of the first logic AND gate circuit by using the first delay circuit. With reference to FIG. 10, FIG. 10 is a schematic diagram of another structure of a PFC control protection circuit according to this application. As shown in FIG. 10, the output terminal 74 of the second comparator circuit COM2 is connected to an input terminal 78 of a first delay circuit Delay1, and an output terminal 79 of the first delay circuit is connected to the first input terminal 75 of the first logic AND gate circuit AND1. It should be understood that the delay circuit is configured to prevent an overvoltage protection function of the first overvoltage protection circuit from being mistakenly triggered. For example, at a closing moment of a switch, when an instantaneous voltage of the second sampling voltage suddenly increases due to noise impact, it is actually unnecessary to trigger overvoltage protection in this scenario. Therefore, mistakenly triggering the overvoltage protection function can be prevented by adding the delay circuit.

Figure 11:
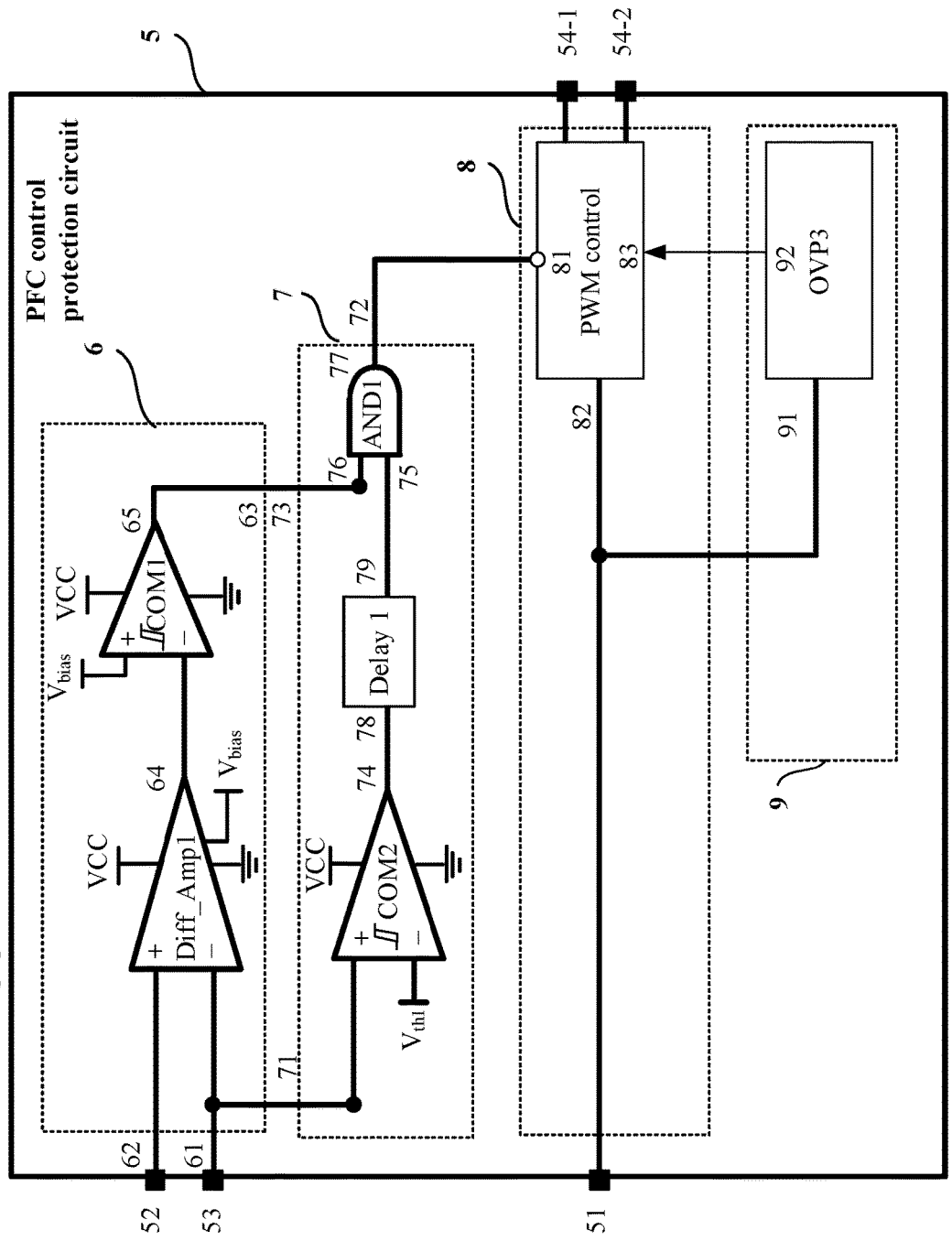
FIG. 11 is a schematic diagram of another structure of a PFC control protection circuit according to this application.

Optionally, in some feasible implementations, the PFC control protection circuit may further be composed of a first overvoltage protection circuit, a PWM control circuit, and another overvoltage protection circuit (for ease of description, a third overvoltage protection circuit is used as an example for description). For example, with reference to FIG. 11, FIG. 11 is a schematic diagram of another structure of a PFC control protection circuit according to this application. An input terminal 91 of a third overvoltage protection circuit 9 serves as the first input terminal 51 of the PFC control protection circuit to connect to the output terminal 42 of the output sampling circuit, and an output terminal 92 of the third overvoltage protection circuit is connected to another enabling terminal 83 of the PWM control circuit. The third overvoltage protection circuit is configured to perform overvoltage protection on the totem-pole PFC circuit based on a first sampling voltage input at the first input terminal. Specifically, when the third overvoltage protection circuit detects that the first sampling voltage is greater than or equal to the voltage protection threshold, the third overvoltage protection circuit may turn off enabling on the PWM control circuit, so as to implement overvoltage protection on the totem-pole PFC circuit.

Figure 12:
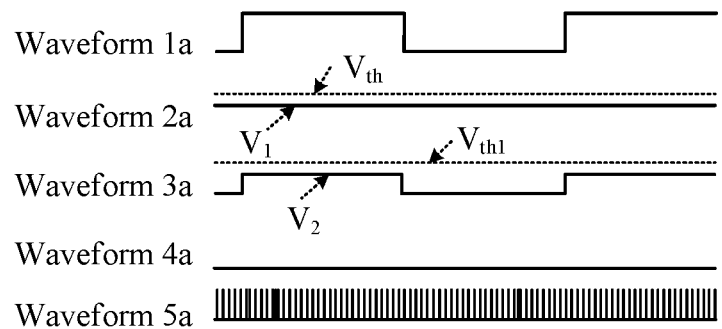
FIG. 12 is a working waveform graph of a PFC circuit in a normal state according to this application.

For example, with reference to FIG. 12, FIG. 12 is a working waveform graph of a PFC circuit in a normal state according to this application. A normal state in FIG. 12 is a state in which the output terminal of the totem-pole PFC circuit does not output overvoltage, and both the voltage divider resistor R8 in the input sampling circuit 3 and the voltage divider resistor R12 in the output sampling circuit 4 in FIG. 11 do not fail or resistance values do not abnormally decrease. Alternatively, the normal state may be considered as a state in which overvoltage protection function of the first overvoltage protection circuit or the third overvoltage protection circuit is not triggered. It should be understood that the first sampling voltage is equal to a voltage at two ends of the voltage divider resistor R12, and the second sampling voltage is equal to a voltage at two ends of the voltage divider resistor R8.

As shown in FIG. 12, a waveform 1a is a signal waveform graph of the output terminal of the first comparator circuit COM1 in the phase detection circuit. A waveform 2a is a signal waveform graph of the output voltage (that is, the first sampling voltage $V_1$) at the output terminal of the output sampling circuit, where Vin is a voltage protection threshold of the third overvoltage protection circuit. It is not difficult to understand that when the first sampling voltage $V_1$ is greater than or equal to the voltage protection threshold Vth of the third overvoltage protection circuit, the overvoltage protection function of the third overvoltage protection circuit may be triggered. A waveform 3a is a signal waveform graph of the output voltage (that is, the second sampling voltage $V_2$) of the second output terminal of the input sampling circuit. $V_{th1}$ is a voltage protection threshold of the first overvoltage protection circuit. It is not difficult to understand that when the second sampling voltage $V_2$ is greater than or equal to the voltage protection threshold $V_{th1}$ of the first overvoltage protection circuit, the overvoltage protection function of the first overvoltage protection circuit may be triggered. It should be understood that both the first overvoltage protection circuit and the third overvoltage protection circuit implement overvoltage protection on the totem-pole PFC circuit by turning off or disabling PWM signal output of the PWM control circuit. A waveform 4a is a signal waveform graph of the output terminal of the first logic AND gate circuit AND1 in the first overvoltage protection circuit. A waveform 5a is a signal waveform graph of the output terminal of the PFC control circuit. It should be understood that when the first logic AND gate circuit in the first overvoltage protection circuit outputs a low level signal, the PWM control circuit may normally output a PWM signal to control on/off of each switch in the totem-pole PFC circuit. When the first logic AND gate circuit in the first overvoltage protection circuit outputs a high level signal, PWM signal output of the PWM control circuit is turned off.

It can be learned from the waveform 1a to the waveform 5a in FIG. 12 that, in a normal state, the second sampling voltage $V_2$ is always less than $V_{th1}$ and the first sampling voltage $V_1$ is always less than Vth. Therefore, an overvoltage protection function of any overvoltage protection circuit is not triggered. As shown in FIG. 12, the PWM control circuit may output a PWM signal to feed back the output voltage at the output terminal of the totem-pole PFC circuit.

Figure 13:
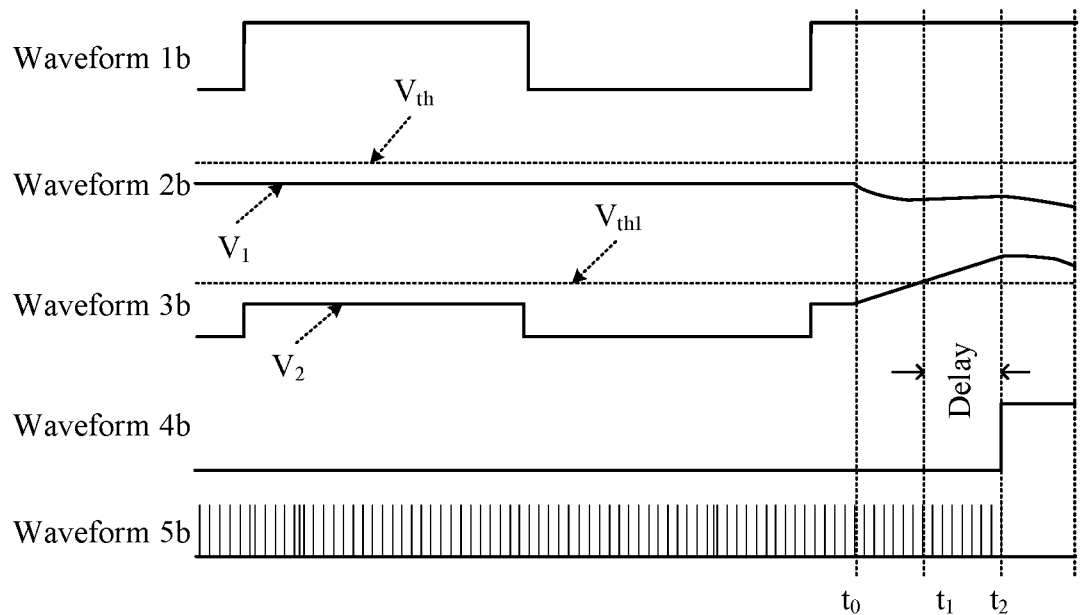
FIG. 13 is a working waveform graph of a PFC circuit in an abnormal state according to this application.

For another example, with reference to FIG. 13, FIG. 13 is a working waveform graph of a PFC circuit in an abnormal state according to this application. It should be understood that the abnormal state in FIG. 13 is a state in which the output terminal of the totem-pole PFC circuit outputs an excessive voltage, a resistance value of the voltage divider resistor R8 in the input sampling circuit in FIG. 11 is normal, and a resistance value of the voltage divider resistor R12 in the output sampling circuit abnormally decreases. It should be understood that the first sampling voltage is equal to a voltage at two ends of the voltage divider resistor R12, and the second sampling voltage is equal to a voltage at two ends of the voltage divider resistor R8.

A waveform 1b is a signal waveform graph of the output terminal of the first comparator circuit COM1 in the phase detection circuit. A waveform 2b is a signal waveform graph of the output voltage (that is, the first sampling voltage $V_1$) at the output terminal of the output sampling circuit, where Vin is the voltage protection threshold of the third overvoltage protection circuit. A waveform 3b is a signal waveform graph of the output voltage (that is, the second sampling voltage $V_2$) of the second output terminal of the input sampling voltage. $V_{th1}$ is the voltage protection threshold of the first overvoltage protection circuit. It should be understood that when the second sampling voltage $V_2$ is greater than or equal to the voltage protection threshold $V_{th1}$, an overvoltage protection function of a second overvoltage protection circuit may be triggered, or when the first sampling voltage $V_1$ is greater than or equal to the voltage protection threshold Vth, the overvoltage protection function of the third overvoltage protection circuit may be triggered. Specifically, both the first overvoltage protection circuit and the third overvoltage protection circuit implement overvoltage protection on the totem-pole PFC circuit by turning off or disabling the PWM signal output of the PWM control circuit. A waveform 4b is a signal waveform graph of the output terminal 77 of the first logic AND gate circuit in the first overvoltage protection circuit 7. A waveform 5b is a signal waveform graph of an output terminal 63 of a PFC control circuit 6. It should be understood that when the first logic AND gate circuit in the first overvoltage protection circuit outputs a low level signal, the PWM control circuit may normally output a PWM signal to control on/off of each switch in the totem-pole PFC circuit. When the first logic AND gate circuit in the first overvoltage protection circuit outputs a high level signal, the PWM signal output of the PWM control circuit is turned off.

It can be learned from the waveform 1b to the waveform 5b in FIG. 13 that, before a moment t0, the PFC circuit is in a normal state, and when the output sampling circuit 4 is abnormal starting from the moment to, for example, when a resistance value of the voltage divider resistor R12 in the output sampling circuit 4 decreases, the first sampling voltage decreases. Therefore, the PWM control circuit outputs the PWM signal to control the totem-pole PFC circuit to further increase an output voltage $V_{bulk}$, and overvoltage is generated. In addition, the third overvoltage protection circuit cannot work normally, that is, the third overvoltage protection circuit detects that the first sampling voltage $V_1$ is always less than the voltage protection threshold Vth. Therefore, the third overvoltage protection circuit may mistakenly determine that overvoltage does not occur at this time, and therefore the overvoltage protection function of the third overvoltage circuit may not be triggered. It can be learned from FIG. 13 that, during a period in which an output signal of the output terminal of the first comparator circuit COM1 is set to high (that is, when the output terminal of the alternating current input circuit outputs a negative voltage), the first overvoltage protection circuit may detect that the second sampling voltage $V_2$ at a moment t1 is greater than the voltage protection threshold $V_{th1}$ (that is, the first overvoltage protection circuit detects that overvoltage occurs starting from the moment t1). Therefore, output of the second comparator circuit COM2 is set to high, and after a delay of the first delay circuit Delby1 ends (that is, when a moment t2 is reached), if the output of the second comparator circuit COM2 is still set to high, output of the first logic AND gate circuit AND1 is set to high. That is, starting from the moment t2, the overvoltage protection function of the first overvoltage protection circuit may be triggered, that is, the first overvoltage protection circuit may turn off the PWM signal output of the PWM control circuit, so as to implement overvoltage protection on the totem-pole PFC circuit when the output sampling circuit is abnormal.

Figure 14:
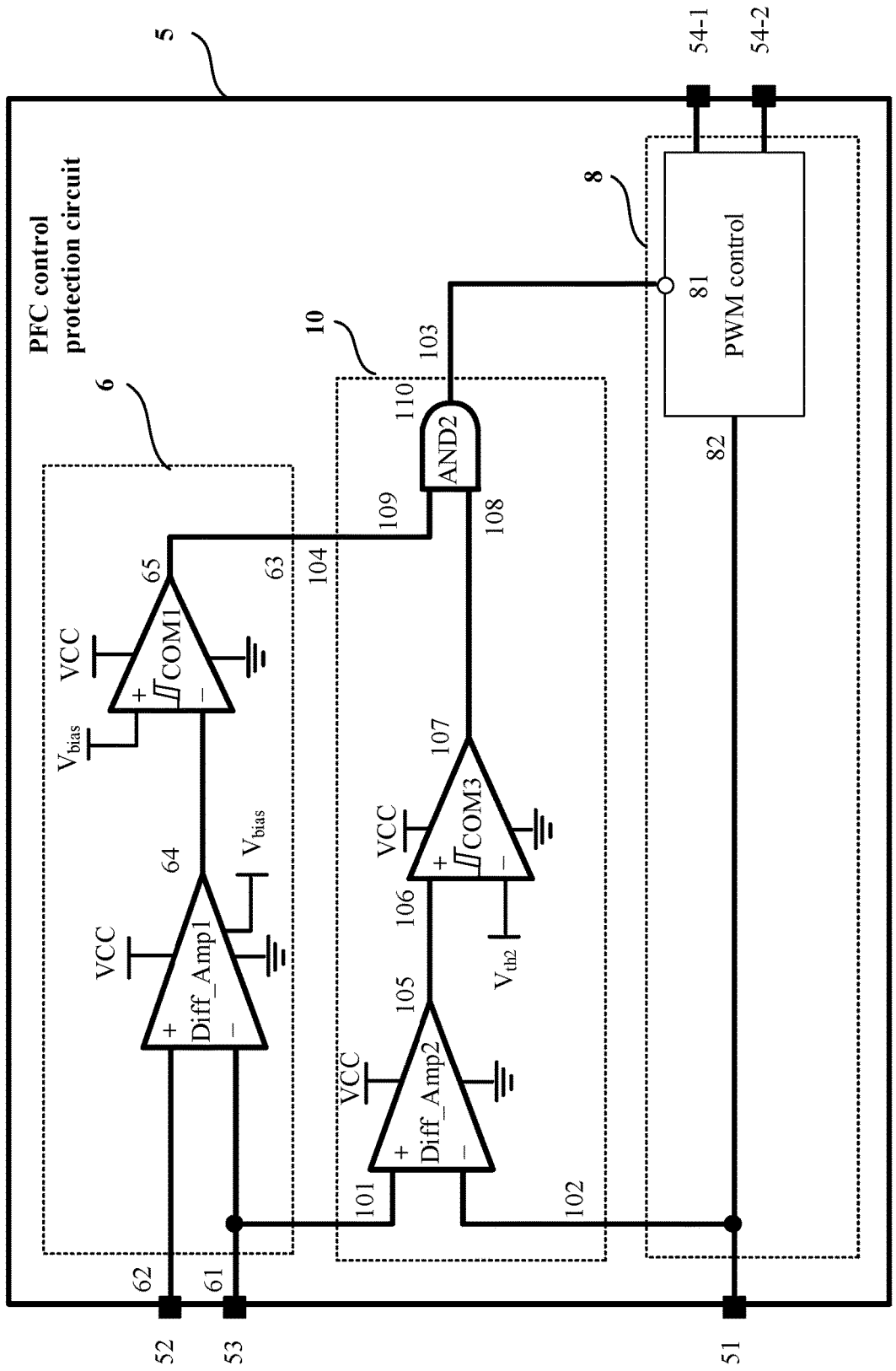
FIG. 14 is a schematic diagram of another structure of a PFC control protection circuit according to this application.

PFC control protection circuit structure 2:

In some feasible implementations, the PFC control protection circuit includes an overvoltage protection circuit (for ease of description, a second overvoltage protection circuit is used as an example for description) and a PWM control circuit. With reference to FIG. 14, FIG. 14 is a schematic diagram of another structure of a PFC control protection circuit according to this application. A first input terminal 101 of a second overvoltage protection circuit 10 serves as the third input terminal 53 of the PFC control protection circuit to connect to the second output terminal 34 of the input sampling circuit, and a second input terminal 102 of the second overvoltage protection circuit 10 and an input terminal 82 of the PWM control circuit serve as the first input terminal 51 of the PFC control protection circuit to connect to the output terminal 42 of the output sampling circuit. An output terminal 103 of the second overvoltage protection circuit is connected to the enabling terminal 81 of the PWM control circuit. The second overvoltage protection circuit 10 is configured to: when the alternating current input circuit outputs a negative voltage, control, based on a voltage difference between the second sampling voltage and the first sampling voltage, enabling on the PWM control circuit to perform overvoltage protection on the totem-pole PFC circuit. That is, when the alternating current input circuit 1 outputs a negative voltage, if the second overvoltage protection circuit detects that the voltage difference between the second sampling voltage and the first sampling voltage is greater than or equal to a voltage protection threshold (for ease of description, a second voltage protection threshold is used as an example for description), the second overvoltage protection circuit may turn off PWM signal output of the PWM control circuit, so as to implement overvoltage protection on the totem-pole PFC circuit. The PWM control circuit is configured to output a PWM signal based on the first sampling voltage to control the output voltage $V_{bulk}$ of the totem-pole PFC circuit 2.

Optionally, in some feasible implementations, the PFC control protection circuit may further include a phase detection circuit. With reference to FIG. 14 together, a first input terminal 61 of a phase detection circuit 6 serves as the third input terminal 53 of the PFC control protection circuit to connect to the second output terminal 34 of the input sampling circuit, and a second input terminal 62 of the phase detection circuit serves as the second input terminal 52 of the PFC control protection circuit to connect to the first output terminal 33 of the input sampling circuit. An output terminal 63 of the phase detection circuit is connected to a third input terminal 104 of the second overvoltage protection circuit. The phase detection circuit 6 is configured to detect that the alternating current input circuit outputs a negative voltage or outputs a positive voltage. Specifically, the phase detection circuit 6 may include a differential amplifier circuit (for ease of description, a first differential amplifier circuit is used as an example for description) and a comparator circuit (for ease of description, a first comparator circuit is used as an example for description). An in-phase input terminal of the first differential amplifier circuit Diff_Amp1 serves as the second input terminal 62 of the phase detection circuit 6 to connect to the first output terminal 33 of the input sampling circuit, and an inverting input terminal of the first differential amplifier circuit Diff_Amp1 serves as the first input terminal 61 of the phase detection circuit to connect to the second output terminal 34 of the input sampling circuit. An output terminal 64 of the first differential amplifier circuit Diff_Amp1 is connected to an inverting input terminal of the first comparator circuit COM1, and an output terminal 65 of the first comparator circuit COM1 serves as the output terminal 63 of the phase detection circuit to connect to the third input terminal 104 of the second overvoltage protection circuit. It should be understood that Vbias in FIG. 14 is a bias voltage, the bias voltage Vbias is introduced in the first differential amplifier circuit, so that the output voltage at the output terminal 64 of the first differential amplifier circuit can be raised as a whole.

The second overvoltage protection circuit may include a differential amplifier circuit (for ease of description, a second differential amplifier circuit is used as an example for description), a comparator circuit (for ease of description, a third comparator circuit is used as an example for description), and a logic AND gate circuit (for ease of description, a second logic AND gate circuit is used as an example for description). With reference to FIG. 14 together, an in-phase input terminal of the second differential amplifier circuit Diff_Amp2 serves as the first input terminal 101 of the second overvoltage protection circuit 10 to connect to the second output terminal 34 of the input sampling circuit 3, and an inverting input terminal of the second differential amplifier circuit Diff_Amp2 serves as the second input terminal 102 of the second overvoltage protection circuit 10 to connect to the output terminal 42 of the output sampling circuit. An output terminal 105 of the second differential amplifier circuit is connected to an in-phase input terminal 106 of the third comparator circuit COM3, and an output terminal 107 of the third comparator circuit COM3 is connected to a first input terminal 108 of the second logic AND gate circuit AND2. A second input terminal 109 of the second logic AND gate circuit AND2 serves as the third input terminal 104 of the second overvoltage protection circuit 10 to connect to the output terminal 63 of the phase detection circuit 6, and an output terminal 110 of the second logic AND gate circuit AND2 serves as the output terminal 103 of the second overvoltage protection circuit 10 to connect to the enabling terminal of the PWM control circuit.

Figure 15:
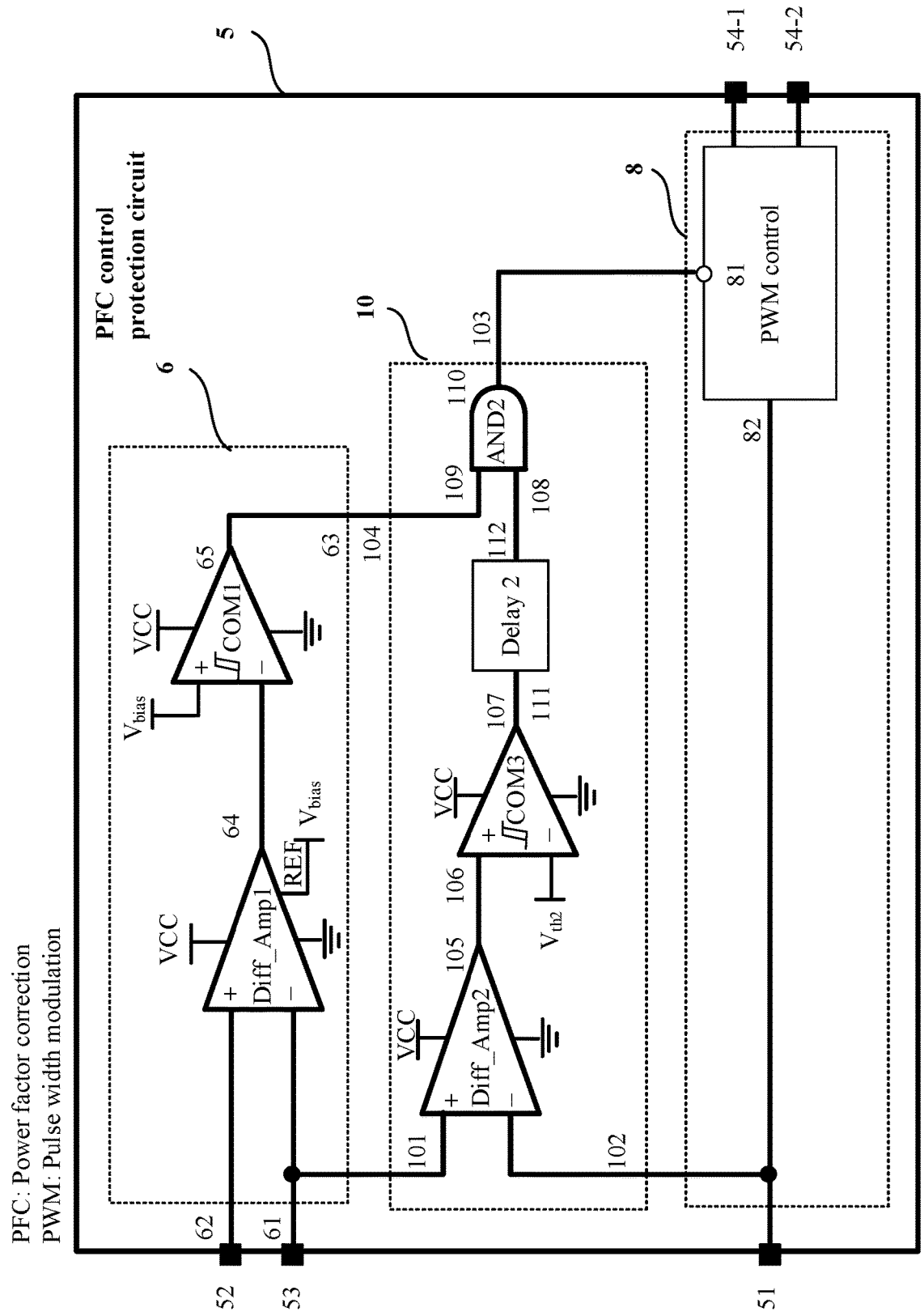
FIG. 15 is a schematic diagram of another structure of a PFC control protection circuit according to this application.

Optionally, in some feasible implementations, the second overvoltage protection circuit may further include a delay circuit (for ease of description, a second delay circuit is used as an example for description). The third comparator circuit is connected to a first input terminal of a second logic AND gate by using the second delay circuit. With reference to FIG. 15, FIG. 15 is a schematic diagram of another structure of a PFC control protection circuit according to this application. As shown in FIG. 15, the output terminal 107 of the third comparator circuit COM3 is connected to an input terminal 111 of the second delay circuit Delay2, and an output terminal 112 of the second delay circuit is connected to the first input terminal 108 of the second logic and gate AND2. It should be understood that the delay circuit may be configured to prevent an overvoltage protection function of the second overvoltage protection circuit from being mistakenly triggered.

Figure 16:
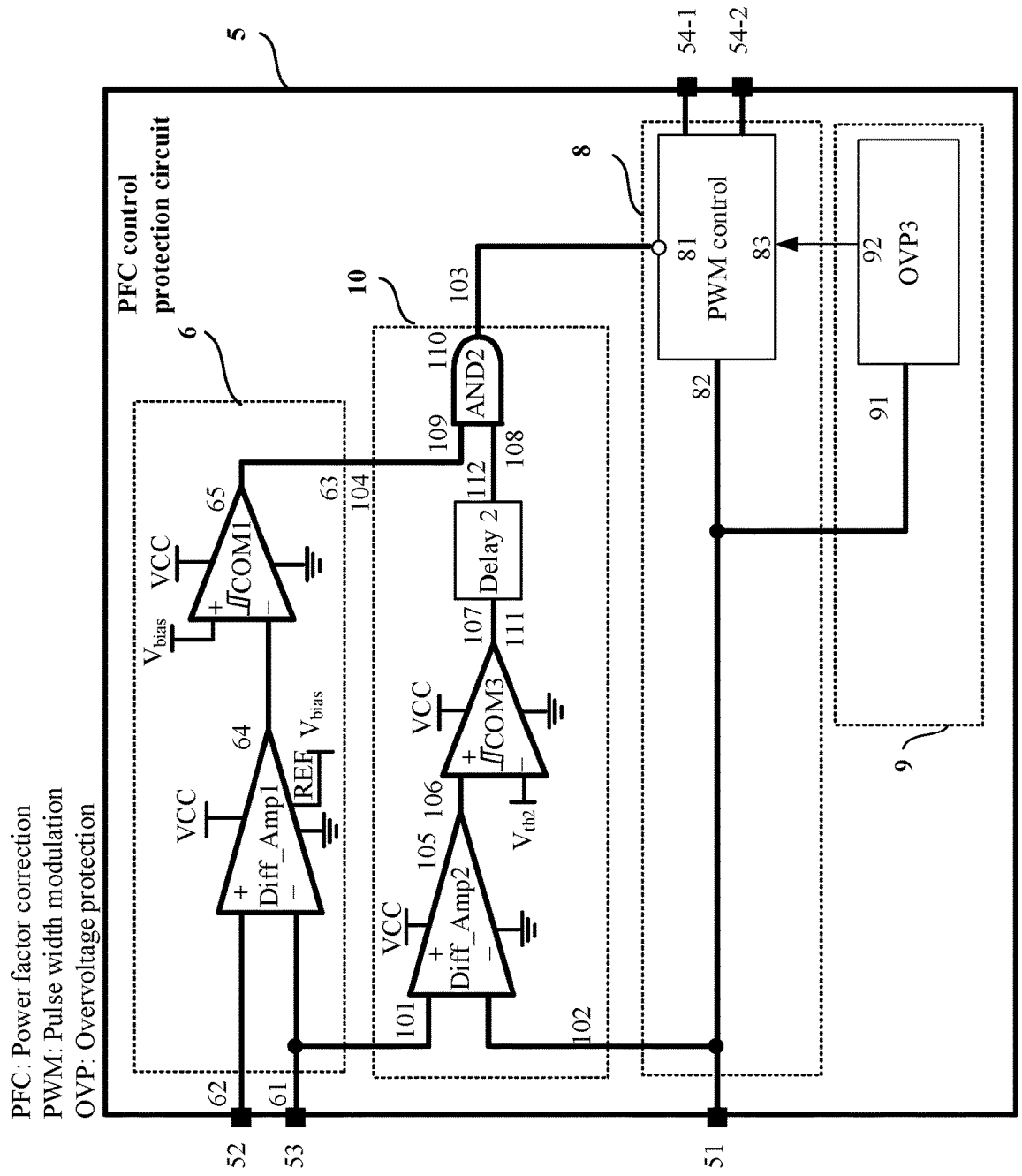
FIG. 16 is a schematic diagram of another structure of a PFC control protection circuit according to this application.

Optionally, in some feasible implementations, the PFC control protection circuit may further be composed of a second overvoltage protection circuit, a PWM control circuit, and another overvoltage protection circuit (for ease of description, the third overvoltage protection circuit is used as an example for description). For example, with reference to FIG. 16, FIG. 16 is a schematic diagram of another structure of a PFC control protection circuit according to this application. An input terminal 91 of a third overvoltage protection circuit 9 serves as the first input terminal 51 of the PFC control protection circuit to connect to the output terminal 42 of the output sampling circuit, and an output terminal 92 of the third overvoltage protection circuit is connected to another enabling terminal 83 of the PWM control circuit. It should be understood that the third overvoltage protection circuit is configured to perform overvoltage protection on the totem-pole PFC circuit based on the first sampling voltage input at the first input terminal. Specifically, when the third overvoltage protection circuit detects that the first sampling voltage is greater than or equal to the voltage protection threshold, the third overvoltage protection circuit may turn off enabling on the PWM control circuit, so as to implement overvoltage protection on the totem-pole PFC circuit.

Figure 17:
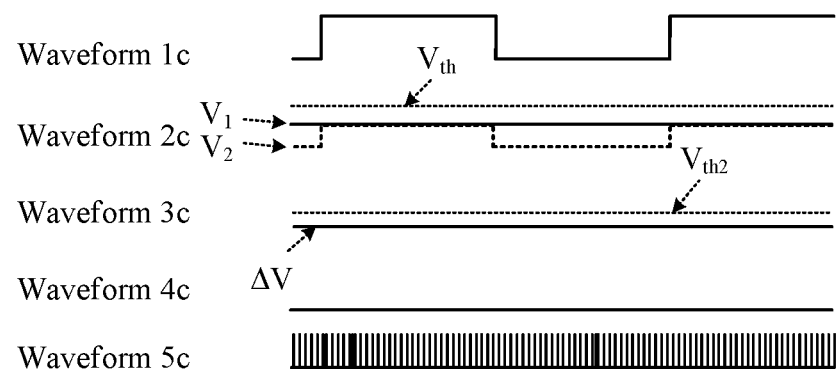
FIG. 17 is another working waveform graph of a PFC circuit in a normal state according to this application.

With reference to FIG. 17, FIG. 17 is another working waveform graph of a PFC circuit in a normal state according to this application. It should be understood that the normal state in FIG. 17 is a state in which the output terminal of the totem-pole PFC circuit does not output overvoltage, and both the voltage divider resistor R8 included in the input sampling circuit and the voltage divider resistor R12 included in the output sampling circuit in FIG. 5 do not fail (that is, resistance values of voltage divider resistors do not abnormally decrease). Alternatively, the normal state may be considered as a state in which the overvoltage protection function of the second overvoltage protection circuit or the third overvoltage protection circuit is not triggered. It should be understood that the first sampling voltage is equal to a voltage at two ends of the voltage divider resistor R12, and the second sampling voltage is equal to a voltage at two ends of the voltage divider resistor R8.

A waveform 1c is a signal waveform graph of the output terminal of the first comparator circuit COM1 in the phase detection circuit. A waveform 2c is a signal waveform graph of the output voltage (that is, the first sampling voltage $V_1$) at the output terminal of the output sampling circuit and a signal waveform graph of the output voltage (that is, the second sampling voltage $V_2$) of the second output terminal of the input sampling voltage. Vin is the voltage protection threshold of the third overvoltage protection circuit. A waveform 3c is a signal waveform graph of an output signal $\Delta V$ of the output terminal of the second differential amplifier circuit after the second sampling voltage $V_2$ and the first sampling voltage $V_1$ are respectively input into the in-phase input terminal and the inverting input terminal that are of the second differential amplifier circuit Diff_Amp2. $V_{th2}$ is a voltage protection threshold of the second overvoltage protection circuit. It should be understood that, in this application, an overvoltage protection principle of the second overvoltage protection circuit is as follows: When $\Delta V$ is greater than or equal to $V_{th2}$, the PWM signal output of the PWM control circuit is turned off or disabled, so as to implement overvoltage protection on the totem-pole PFC circuit. Correspondingly, an overvoltage protection principle of the third overvoltage protection circuit is as follows: When $V_1$ is greater than or equal to $V_{th}$, the PWM signal output of the PWM control circuit is turned off or disabled, so as to implement overvoltage protection on the totem-pole PFC circuit. A waveform 4c is a signal waveform graph of the output terminal of the second logic AND gate circuit AND2 in the second overvoltage protection circuit. A waveform 5c is a signal waveform graph of the output terminal of the PFC control circuit. It should be understood that when the second logic AND gate circuit in the second overvoltage protection circuit outputs a low level signal, the PWM control circuit may normally output a PWM signal to control on/off of each switch in the totem-pole PFC circuit. When the second logic AND gate circuit in the second overvoltage protection circuit outputs a high level signal, the PWM signal output of the PWM control circuit is turned off.

Specifically, it can be learned from the waveform 1c to the waveform 5c in FIG. 17 that, in the normal state, $V_1$ is always less than $V_{Th}$, and $\Delta V$ is always less than $V_{th2}$. Therefore, an overvoltage protection function of any overvoltage protection circuit may not be triggered. As shown in FIG. 17, the PWM control circuit may normally output a PWM signal. On/off of each switch in the totem-pole PFC circuit may be controlled by using the PWM signal, so as to feed back and adjust the output voltage at the output terminal of the totem-pole PFC circuit.

Figure 18:
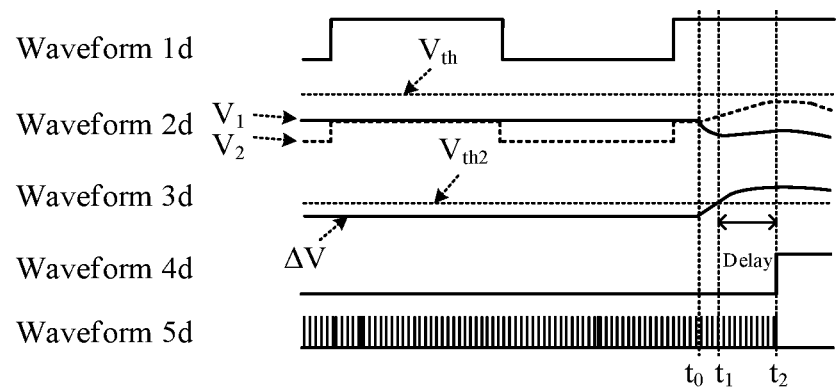
FIG. 18 is another working waveform graph of a PFC circuit in an abnormal state according to this application.

When the output sampling circuit 4 is abnormal, for example, a resistance value of R12 in the output sampling circuit 4 decreases, a main working waveform of the PFC circuit is shown in FIG. 18. Specifically, FIG. 18 is another working waveform graph of a PFC circuit in an abnormal state according to this application. It should be understood that the abnormal state in FIG. 18 is a state in which the output terminal of the totem-pole PFC circuit outputs an excessive voltage, a resistance value of the voltage divider resistor R8 included in the input sampling circuit in FIG. 5 is normal, and a resistance value of the voltage divider resistor R12 included in the output sampling circuit abnormally decreases. It should be understood that the first sampling voltage is equal to a voltage at two ends of the voltage divider resistor R12, and the second sampling voltage is equal to a voltage at two ends of the voltage divider resistor R8.

A waveform 1d is a signal waveform graph of the output terminal of the first comparator circuit COM1 in the phase detection circuit. A waveform 2d is a signal waveform graph of the output voltage (that is, the first sampling voltage $V_1$) at the output terminal of the output sampling circuit and a signal waveform graph of the output voltage (that is, the second sampling voltage $V_2$) of the second output terminal of the input sampling voltage. $V_{th}$ is the voltage protection threshold of the third overvoltage protection circuit. A waveform 3d is a signal waveform graph of the output signal ΔV of the output terminal of the second differential amplifier circuit after the second sampling voltage $V_2$ and the first sampling voltage $V_1$ are respectively input into the in-phase input terminal and the inverting input terminal that are of the second differential amplifier circuit Diff_Amp2. $V_{th2}$ is the voltage protection threshold of the second overvoltage protection circuit. Generally, when ΔV is greater than or equal to the voltage protection threshold $V_{th2}$, the overvoltage protection function of the second overvoltage protection circuit may be triggered, or when the first sampling voltage $V_1$ is greater than or equal to the voltage protection threshold $V_{th}$, the overvoltage protection function of the third overvoltage protection circuit may be triggered. It should be understood that both the second overvoltage protection circuit and the third overvoltage protection circuit implement overvoltage protection on the totem-pole PFC circuit by turning off or disabling the PWM signal output of the PWM control circuit. A waveform 4d is a signal waveform graph of the output terminal of the second logic AND gate circuit AND2 in the second overvoltage protection circuit. A waveform 5d is a signal waveform graph of the output terminal of the PFC control circuit. It should be understood that when the second logic AND gate circuit in the second overvoltage protection circuit outputs a low level signal, the PWM control circuit may normally output a PWM signal to control on/off of each switch in the totem-pole PFC circuit. When the second logic AND gate circuit in the second overvoltage protection circuit outputs a high level signal, the PWM signal output of the PWM control circuit is turned off.

Specifically, it can be learned from the waveform Id to the waveform 5d in FIG. 18 that, before a moment t0, the PFC circuit is in a normal state, and when the output sampling circuit 4 is abnormal starting from the moment to, for example, when a resistance value of the voltage divider resistor R12 in the output sampling circuit 4 decreases, the first sampling voltage decreases. Therefore, the PWM control circuit outputs the PWM signal to control the totem-pole PFC circuit to increase the output voltage $V_{bulk}$, and overvoltage is generated. It can be learned from FIG. 18 that when the output signal of the output terminal of the first comparator circuit COM1 is set to high (that is, when the alternating current input circuit outputs a negative voltage), the second overvoltage protection circuit may detect at a moment t1 that ΔV is greater than $V_{th2}$ (that is, the second overvoltage protection circuit may detect that overvoltage occurs on the output voltage of the totem-pole PFC circuit starting from the moment t1). Therefore, output of the third comparator circuit COM3 is set to high, and after a delay of the second delay circuit Deldy2 ends (that is, when a moment t2 is reached), if the output of the third comparator circuit COM3 is still set to high, output of the second logic and gate AND2 is set to high, so that the overvoltage protection function of the second overvoltage protection circuit can be triggered. That is, starting from the moment t2, the PWM signal output controlled by the PWM may be turned off, so as to implement overvoltage protection on the totem-pole PFC circuit when the output sampling circuit is abnormal.

In this application, when the alternating current input circuit outputs a negative voltage, the first overvoltage protection circuit may determine, based on a size relationship between the second sampling voltage sampled by the second output terminal of the input sampling circuit and the first voltage protection threshold, or the second overvoltage protection circuit may determine, based on a size relationship between the voltage difference between the second sampling voltage and the first sampling voltage sampled by the output sampling circuit and the second voltage protection threshold, whether overvoltage occurs on the output voltage of the totem-pole PFC circuit. When it is determined that overvoltage occurs on the output voltage of the totem-pole PFC circuit (that is, when the second sampling voltage is greater than or equal to the first voltage protection threshold or the voltage difference between the second sampling voltage and the first sampling voltage is greater than or equal to the second voltage protection threshold), the first overvoltage protection circuit or the second overvoltage protection circuit may turn off the PWM signal output of the PWM control circuit, so as to implement overvoltage protection on the totem-pole PFC circuit when the output sampling circuit is abnormal.

Figure 19:
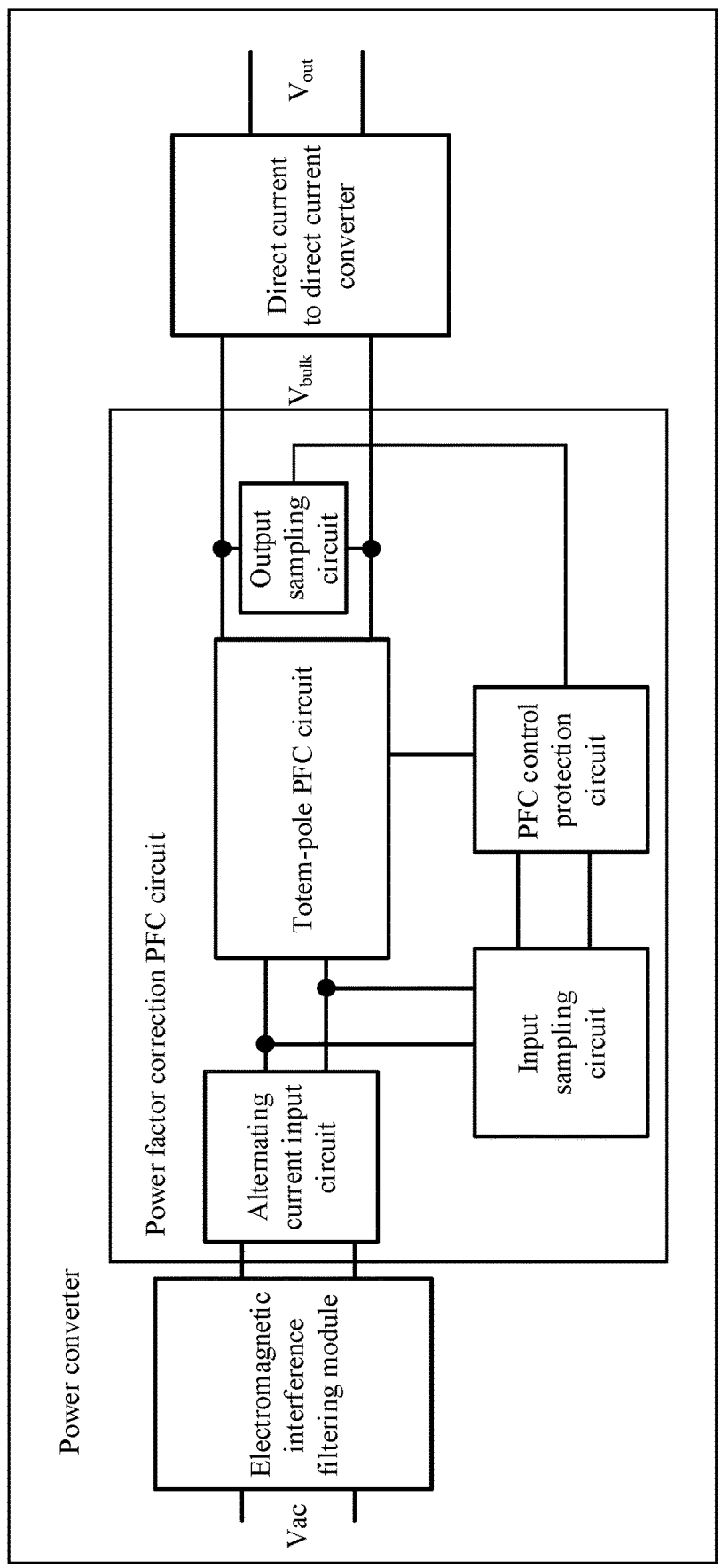
FIG. 19 is a schematic diagram of a structure of a power converter according to this application.

Further, this application further provides a power converter. With reference to FIG. 19, FIG. 19 is a schematic diagram of a structure of a power converter according to this application. As shown in FIG. 19, the power converter includes the PFC circuit provided in this application and a DC/DC converter. Specifically, the PFC circuit includes an alternating current input circuit, a totem-pole PFC circuit, an input sampling circuit, an output sampling circuit, and a PFC control protection circuit. The alternating current input circuit of the PFC circuit is connected to an alternating current power supply $V_{ac}$. An output terminal of the totem-pole PFC circuit of the PFC circuit is connected to an output terminal of the power converter by using the DC/DC converter. Optionally, the power converter may further include an EMI filtering module. The alternating current input circuit of the PFC circuit is connected to the alternating current power supply $V_{ac}$ by using the EMI filtering module. That is, one end of the EMI filtering module is connected to the alternating current power supply $V_{ac}$, and the other end of the EMI filtering module is connected to the alternating current input circuit of the power factor correction circuit. It should be understood that the EMI filtering module is configured to filter electromagnetic interference in the alternating current power supply $V_{ac}$ to obtain an output voltage Vin of the alternating current input circuit. The DC/DC converter is configured to convert a high-voltage direct current bus voltage $V_{bulk}$ output from the PFC circuit into a low-voltage direct current output voltage Vout. The DC/DC converter may include an isolated DC/DC converter, and a step-down ratio of the DC/DC converter is determined by an output terminal voltage of the totem-pole PFC circuit and an output terminal voltage of the power converter. It is not difficult to understand that, because the power factor correction circuit provided in this application implements overvoltage protection on the totem-pole PFC circuit when the output sampling circuit is abnormal, overvoltage protection on the entire power converter can also be implemented, thereby ensuring stable operation of the entire power converter.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A power factor correction (PFC) circuit, wherein the PFC circuit comprises an alternating current input circuit, a totem-pole PFC circuit, an input sampling circuit, an output sampling circuit, and a PFC control protection circuit,
    wherein a first output terminal of the alternating current input circuit is respectively connected to a first input terminal of the totem-pole PFC circuit and a first input terminal of the input sampling circuit, a second output terminal of the alternating current input circuit is respectively connected to a second input terminal of the totem-pole PFC circuit and a second input terminal of the input sampling circuit, an output terminal of the totem-pole PFC circuit is connected to an input terminal of the output sampling circuit, an output terminal of the output sampling circuit is connected to a first input terminal of the PFC control protection circuit, a first output terminal of the input sampling circuit and a second output terminal of the input sampling circuit are respectively connected to a second input terminal of the PFC control protection circuit and a third input terminal of the PFC control protection circuit, and an output terminal of the PFC control protection circuit is connected to a third input terminal of the totem-pole PFC circuit;
    wherein the PFC control protection circuit is configured to control an output voltage of the totem-pole PFC circuit based on a first sampling voltage input at the first input terminal of the PFC control protection circuit, and the PFC control protection circuit is further configured to: when the alternating current input circuit outputs a negative voltage, perform overvoltage protection on the totem-pole PFC circuit based on a second sampling voltage input at the third input terminal, wherein when the alternating current input circuit outputs the negative voltage, an output voltage at the first output terminal of the alternating current input circuit is less than an output voltage at the second output terminal of the alternating current input circuit.

2. The PFC circuit according to claim 1, wherein the input sampling circuit comprises a first channel of voltage divider resistor and a second channel of voltage divider resistor,
    wherein the first channel of voltage divider resistor comprises a first voltage divider resistor and a second voltage divider resistor that are connected in series between the first output terminal of the alternating current input circuit and a ground terminal, and a series connection point of the first voltage divider resistor and the second voltage divider resistor serves as the first output terminal of the input sampling circuit to connect to the second input terminal of the PFC control protection circuit; and
    wherein the second channel of voltage divider resistor comprises a third voltage divider resistor and a fourth voltage divider resistor that are connected in series between the second output terminal of the alternating current input circuit and the ground terminal, and a series connection point of the third voltage divider resistor and the fourth voltage divider resistor serves as the second output terminal of the input sampling circuit to connect to the third input terminal of the PFC control protection circuit.

3. The PFC circuit according to claim 2, wherein the PFC control protection circuit comprises a first overvoltage protection circuit and a pulse width modulation (PWM) control circuit, wherein
    a first input terminal of the first overvoltage protection circuit serves as the third input terminal of the PFC control protection circuit to connect to the second output terminal of the input sampling circuit, an output terminal of the first overvoltage protection circuit is connected to an enabling terminal of the PWM control circuit, and an input terminal of the PWM control circuit serves as the first input terminal of the PFC control protection circuit to connect to the output terminal of the output sampling circuit;
    the first overvoltage protection circuit is configured to: when the alternating current input circuit outputs the negative voltage, if it is determined that the second sampling voltage is greater than or equal to a first voltage protection threshold, turn off output of the PWM control circuit to perform overvoltage protection on the totem-pole PFC circuit; and
    the PWM control circuit is configured to control the output voltage of the totem-pole PFC circuit based on the first sampling voltage.

4. The PFC circuit according to claim 3, wherein the PFC control protection circuit further comprises a phase detection circuit, wherein
    a first input terminal of the phase detection circuit serves as the third input terminal of the PFC control protection circuit to connect to the second output terminal of the input sampling circuit;
    a second input terminal of the phase detection circuit serves as the second input terminal of the PFC control protection circuit to connect to the first output terminal of the input sampling circuit;
    an output terminal of the phase detection circuit is connected to a second input terminal of the first overvoltage protection circuit or a third input terminal of the second overvoltage protection circuit; and
    the phase detection circuit is configured to detect that the alternating current input circuit outputs a negative voltage or outputs a positive voltage.

5. The PFC circuit according to claim 4, wherein the phase detection circuit comprises a first differential amplifier circuit and a first comparator circuit, wherein
- an in-phase input terminal of the first differential amplifier circuit serves as the second input terminal of the phase detection circuit to connect to the first output terminal of the input sampling circuit, and an inverting input terminal of the first differential amplifier circuit serves as the first input terminal of the phase detection circuit to connect to the second output terminal of the input sampling circuit; and
- an output terminal of the first differential amplifier circuit is connected to an inverting input terminal of the first comparator circuit, and an output terminal of the first comparator circuit serves as the output terminal of the phase detection circuit to connect to the second input terminal of the first overvoltage protection circuit or the third input terminal of the second overvoltage protection circuit.

6. The PFC circuit according to claim 3, wherein the first overvoltage protection circuit comprises a second comparator circuit and a first logic AND gate circuit, wherein
- an in-phase input terminal of the second comparator circuit serves as the first input terminal of the first overvoltage protection circuit to connect to the second output terminal of the input sampling circuit; and
- an output terminal of the second comparator circuit is connected to a first input terminal of the first logic AND gate circuit, a second input terminal of the first logic AND gate circuit serves as a second input terminal of the first overvoltage protection circuit to connect to an output terminal of a phase detection circuit, and an output terminal of the first logic AND gate circuit serves as the output terminal of the first overvoltage protection circuit to connect to the enabling terminal of the PWM control circuit.

7. The PFC circuit according to claim 6, wherein the first overvoltage protection circuit or the second overvoltage protection circuit further comprises a delay circuit, wherein
- the output terminal of the second comparator circuit or the output terminal of the third comparator circuit is connected to an input terminal of the delay circuit; and
- an output terminal of the delay circuit is connected to the first input terminal of the first logic AND gate circuit or the second logic AND gate circuit.

8. The PFC circuit according to claim 2, wherein the PFC control protection circuit comprises a second overvoltage protection circuit and a pulse width modulation (PWM) control circuit, wherein
- a first input terminal of the second overvoltage protection circuit serves as the third input terminal of the PFC control protection circuit to connect to the second output terminal of the input sampling circuit, a second input terminal of the second overvoltage protection circuit and an input terminal of the PWM control circuit serve as the first input terminal of the PFC control protection circuit to connect to the output terminal of the output sampling circuit, and an output terminal of the second overvoltage protection circuit is connected to an enabling terminal of the PWM control the second overvoltage protection circuit is configured to: when the alternating current input circuit outputs a negative voltage, if it is determined that a voltage difference between the second sampling voltage and the first sampling voltage is greater than or equal to a second voltage protection threshold, turn off output of the PWM control circuit to perform overvoltage protection on the totem-pole PFC circuit; and
- the PWM control circuit is configured to control the output voltage of the totem-pole PFC circuit based on the first sampling voltage.

9. The PFC circuit according to claim 8, wherein the second overvoltage protection circuit comprises a second differential amplifier circuit, a third comparator circuit, and a second logic AND gate circuit, wherein
- an in-phase input terminal of the second differential amplifier circuit serves as the first input terminal of the second overvoltage protection circuit to connect to the second output terminal of the input sampling circuit, an inverting input terminal of the second differential amplifier circuit serves as the second input terminal of the second overvoltage protection circuit to connect to the output terminal of the output sampling circuit, an output terminal of the second differential amplifier circuit is connected to an in-phase input terminal of the third comparator, an output terminal of the third comparator is connected to a first input terminal of the second logic AND gate circuit, a second input terminal of the second logic AND gate circuit serves as a third input terminal of the second overvoltage protection circuit to connect to an output terminal of a phase detection circuit, and an output terminal of the second logic AND gate circuit serves as the output terminal of the second overvoltage protection circuit to connect to the enabling terminal of the PWM control circuit.

10. The PFC circuit according to claim 1, wherein the output sampling circuit comprises a third channel of voltage divider resistor, wherein
- the third channel of voltage divider resistor comprises a fifth voltage divider resistor and a sixth voltage divider resistor that are connected in series between the output terminal of the totem-pole PFC circuit and the ground terminal, and a series connection point of the fifth voltage divider resistor and the sixth voltage divider resistor serves as the output terminal of the output sampling circuit to connect to the first input terminal of the PFC control protection circuit.

11. A power converter, comprising a power factor correction (PFC) circuit and a direct current to direct current (DC/DC) converter, wherein the PFC circuit comprises an alternating current input circuit, a totem-pole PFC circuit, an input sampling circuit, an output sampling circuit, and a PFC control protection circuit;
- a first output terminal of the alternating current input circuit is respectively connected to a first input terminal of the totem-pole PFC circuit and a first input terminal of the input sampling circuit, a second output terminal of the alternating current input circuit is respectively connected to a second input terminal of the totem-pole PFC circuit and a second input terminal of the input sampling circuit, an output terminal of the totem-pole PFC circuit is connected to an input terminal of the output sampling circuit, an output terminal of the output sampling circuit is connected to a first input terminal of the PFC control protection circuit, a first output terminal and a second output terminal that are of the input sampling circuit are respectively connected to a second input terminal and a third input terminal that are of the PFC control protection circuit, and an output terminal of the PFC control protection circuit is connected to a third input terminal of the totem-pole PFC circuit;

the PFC control protection circuit is configured to control an output voltage of the totem-pole PFC circuit based on a first sampling voltage input at the first input terminal of the PFC control protection circuit, and the PFC control protection circuit is further configured to: when the alternating current input circuit outputs a negative voltage, perform overvoltage protection on the totem-pole PFC circuit based on a second sampling voltage input at the third input terminal, wherein when the alternating current input circuit outputs the negative voltage, an output voltage at the first output terminal of the alternating current input circuit is less than an output voltage at the second output terminal of the alternating current input circuit; and an alternating current input circuit of the power factor correction circuit is connected to an alternating current power supply, and an output terminal of a totem-pole PFC circuit of the power factor correction circuit is connected to an output terminal of the power converter by using the DC/DC converter.

12. The power converter according to claim 11, wherein the power converter further comprises an electromagnetic interference (EMI) filtering module, and the alternating current input circuit of the power factor correction circuit is connected to the alternating current power supply by using the EMI filtering module.

13. The power converter according to claim 11, wherein the DC/DC converter is an isolated DC/DC converter, and a step-down ratio of the DC/DC converter is determined by an output terminal voltage of the totem-pole PFC circuit and an output terminal voltage of the power converter.

14. The power converter according to claim 11, wherein the input sampling circuit comprises a first channel of voltage divider resistor and a second channel of voltage divider resistor, wherein the first channel of voltage divider resistor comprises a first voltage divider resistor and a second voltage divider resistor that are connected in series between the first output terminal of the alternating current input circuit and a ground terminal, and a series connection point of the first voltage divider resistor and the second voltage divider resistor serves as the first output terminal of the input sampling circuit to connect to the second input terminal of the PFC control protection circuit; and wherein the second channel of voltage divider resistor comprises a third voltage divider resistor and a fourth voltage divider resistor that are connected in series between the second output terminal of the alternating current input circuit and the ground terminal, and a series connection point of the third voltage divider resistor and the fourth voltage divider resistor serves as the second output terminal of the input sampling circuit to connect to the third input terminal of the PFC control protection circuit.

15. The power converter according to claim 14, wherein the PFC control protection circuit comprises a first overvoltage protection circuit and a pulse width modulation (PWM) control circuit, wherein a first input terminal of the first overvoltage protection circuit serves as the third input terminal of the PFC control protection circuit to connect to the second output terminal of the input sampling circuit, an output terminal of the first overvoltage protection circuit is connected to an enabling terminal of the PWM control circuit, and an input terminal of the PWM control circuit serves as the first input terminal of the PFC control protection circuit to connect to the output terminal of the output sampling circuit;

the first overvoltage protection circuit is configured to: when the alternating current input circuit outputs the negative voltage, if it is determined that the second sampling voltage is greater than or equal to a first voltage protection threshold, turn off output of the PWM control circuit to perform overvoltage protection on the totem-pole PFC circuit; and the PWM control circuit is configured to control the output voltage of the totem-pole PFC circuit based on the first sampling voltage.

16. The power converter according to claim 14, wherein the PFC control protection circuit comprises a second overvoltage protection circuit and a pulse width modulation (PWM) control circuit, wherein a first input terminal of the second overvoltage protection circuit serves as the third input terminal of the PFC control protection circuit to connect to the second output terminal of the input sampling circuit, a second input terminal of the second overvoltage protection circuit and an input terminal of the PWM control circuit serve as the first input terminal of the PFC control protection circuit to connect to the output terminal of the output sampling circuit, and an output terminal of the second overvoltage protection circuit is connected to an enabling terminal of the PWM control circuit;

the second overvoltage protection circuit is configured to: when the alternating current input circuit outputs a negative voltage, if it is determined that a voltage difference between the second sampling voltage and the first sampling voltage is greater than or equal to a second voltage protection threshold, turn off output of the PWM control circuit to perform overvoltage protection on the totem-pole PFC circuit; and the PWM control circuit is configured to control the output voltage of the totem-pole PFC circuit based on the first sampling voltage.

17. An electronic device, comprising a power factor correction (PFC) circuit and a direct current to direct current (DC/DC) converter, wherein the PFC circuit comprises an alternating current input circuit, a totem-pole PFC circuit, an input sampling circuit, an output sampling circuit, and a PFC control protection circuit;

a first output terminal of the alternating current input circuit is respectively connected to a first input terminal of the totem-pole PFC circuit and a first input terminal of the input sampling circuit, a second output terminal of the alternating current input circuit is respectively connected to a second input terminal of the totem-pole PFC circuit and a second input terminal of the input sampling circuit, an output terminal of the totem-pole PFC circuit is connected to an input terminal of the output sampling circuit, an output terminal of the output sampling circuit is connected to a first input terminal of the PFC control protection circuit, a first output terminal and a second output terminal that are of the input sampling circuit are respectively connected to a second input terminal and a third input terminal that are of the PFC control protection circuit, and an output terminal of the PFC control protection circuit is connected to a third input terminal of the totem-pole PFC circuit;

the PFC control protection circuit is configured to control an output voltage of the totem-pole PFC circuit based on a first sampling voltage input at the first input terminal of the PFC control protection circuit, and the PFC control protection circuit is further configured to: when the alternating current input circuit outputs a negative voltage, perform overvoltage protection on the totem-pole PFC circuit based on a second sampling voltage input at the third input terminal, wherein when the alternating current input circuit outputs the negative voltage, an output voltage at the first output terminal of the alternating current input circuit is less than an output voltage at the second output terminal of the alternating current input circuit; and an alternating current input circuit of the power factor correction circuit is connected to an alternating current power supply, and an output terminal of a totem-pole PFC circuit of the power factor correction circuit is connected to an output terminal of the power converter by using the DC/DC converter.

18. The electronic device according to claim 17, wherein the input sampling circuit comprises a first channel of voltage divider resistor and a second channel of voltage divider resistor, wherein the first channel of voltage divider resistor comprises a first voltage divider resistor and a second voltage divider resistor that are connected in series between the first output terminal of the alternating current input circuit and a ground terminal, and a series connection point of the first voltage divider resistor and the second voltage divider resistor serves as the first output terminal of the input sampling circuit to connect to the second input terminal of the PFC control protection circuit; and wherein the second channel of voltage divider resistor comprises a third voltage divider resistor and a fourth voltage divider resistor that are connected in series between the second output terminal of the alternating current input circuit and the ground terminal, and a series connection point of the third voltage divider resistor and the fourth voltage divider resistor serves as the second output terminal of the input sampling circuit to connect to the third input terminal of the PFC control protection circuit.

19. The electronic device according to claim 18, wherein the PFC control protection circuit comprises a first overvoltage protection circuit and a pulse width modulation (PWM) control circuit, wherein a first input terminal of the first overvoltage protection circuit serves as the third input terminal of the PFC control protection circuit to connect to the second output terminal of the input sampling circuit, an output terminal of the first overvoltage protection circuit is connected to an enabling terminal of the PWM control circuit, and an input terminal of the PWM control circuit serves as the first input terminal of the PFC control protection circuit to connect to the output terminal of the output sampling circuit;

the first overvoltage protection circuit is configured to: when the alternating current input circuit outputs the negative voltage, if it is determined that the second sampling voltage is greater than or equal to a first voltage protection threshold, turn off output of the PWM control circuit to perform overvoltage protection on the totem-pole PFC circuit; and the PWM control circuit is configured to control the output voltage of the totem-pole PFC circuit based on the first sampling voltage.

20. The electronic device according to claim 18, wherein the PFC control protection circuit comprises a second overvoltage protection circuit and a pulse width modulation (PWM) control circuit, wherein a first input terminal of the second overvoltage protection circuit serves as the third input terminal of the PFC control protection circuit to connect to the second output terminal of the input sampling circuit, a second input terminal of the second overvoltage protection circuit and an input terminal of the PWM control circuit serve as the first input terminal of the PFC control protection circuit to connect to the output terminal of the output sampling circuit, and an output terminal of the second overvoltage protection circuit is connected to an enabling terminal of the PWM control circuit;

the second overvoltage protection circuit is configured to: when the alternating current input circuit outputs a negative voltage, if it is determined that a voltage difference between the second sampling voltage and the first sampling voltage is greater than or equal to a second voltage protection threshold, turn off output of the PWM control circuit to perform overvoltage protection on the totem-pole PFC circuit; and the PWM control circuit is configured to control the output voltage of the totem-pole PFC circuit based on the first sampling voltage.

* * * * *